United States Patent
Wang et al.

(10) Patent No.: US 12,401,546 B2
(45) Date of Patent: Aug. 26, 2025

(54) UPLINK TRANSMISSION METHOD AND APPARATUS, DEVICE, AND STORAGE MEDIUM

(71) Applicant: VIVO MOBILE COMMUNICATION CO., LTD., Guangdong (CN)

(72) Inventors: Yong Wang, Guangdong (CN); Yi Gu, Guangdong (CN)

(73) Assignee: VIVO MOBILE COMMUNICATION CO., LTD., Guandong (CN)

( * ) Notice: Subject to any disclaimer, the term of this patent is extended or adjusted under 35 U.S.C. 154(b) by 406 days.

(21) Appl. No.: 17/869,216

(22) Filed: Jul. 20, 2022

(65) Prior Publication Data
US 2022/0360472 A1   Nov. 10, 2022

Related U.S. Application Data

(63) Continuation of application No. PCT/CN2021/072125, filed on Jan. 15, 2021.

(30) Foreign Application Priority Data

Jan. 22, 2020 (CN) .......................... 202010075783.5

(51) Int. Cl.
*H04W 52/36* (2009.01)
*H04L 5/00* (2006.01)
*H04L 25/02* (2006.01)
*H04W 52/14* (2009.01)

(52) U.S. Cl.
CPC ........ *H04L 25/0224* (2013.01); *H04L 5/0048* (2013.01); *H04L 25/0204* (2013.01); *H04W 52/146* (2013.01); *H04W 52/367* (2013.01)

(58) Field of Classification Search
CPC .............. H04L 25/0224; H04L 5/0091; H04L 25/0226; H04L 5/001; H04L 5/0053; H04W 52/146
See application file for complete search history.

(56) References Cited

U.S. PATENT DOCUMENTS

2018/0131492 A1* 5/2018 John Wilson ........ H04B 7/0617
2018/0323830 A1  11/2018 Park et al.
2019/0356364 A1* 11/2019 Maamari ............... H04L 5/0062
(Continued)

FOREIGN PATENT DOCUMENTS

CN       108809575 A    11/2018
CN       109150467 A    1/2019
(Continued)

OTHER PUBLICATIONS

Nokia, "Summary of QCL", 3GPP TSG-RAN WG1 Meeting #90bis, R1-1718863, Prague, Czech Republic, Oct. 9-13, 2017.

*Primary Examiner* — Pamit Kaur
(74) *Attorney, Agent, or Firm* — Price Heneveld LLP

(57) ABSTRACT

Embodiments of this disclosure disclose an uplink transmission method and apparatus, a device, and a storage medium. The uplink transmission method is applied to a terminal device. The uplink transmission method includes: receiving indication information sent by a network device, where the indication information is used to indicate that a plurality of first uplink transmissions satisfy a quasi co-location relationship; and performing the plurality of first uplink transmissions based on the indication information.

19 Claims, 15 Drawing Sheets

(56) References Cited

U.S. PATENT DOCUMENTS

| | | |
|---|---|---|
| 2019/0373602 A1 | 12/2019 | Qin et al. |
| 2020/0007294 A1 | 1/2020 | Yang et al. |
| 2020/0076557 A1 | 3/2020 | Sun et al. |
| 2020/0145082 A1* | 5/2020 | Chen .................... H04L 5/0023 |
| 2022/0174716 A1* | 6/2022 | Takeda .............. H04W 74/0808 |

FOREIGN PATENT DOCUMENTS

| | | | |
|---|---|---|---|
| CN | 110034876 A | 7/2019 | |
| CN | 110299978 A | 10/2019 | |
| EP | 3565170 A1 | 11/2019 | |
| WO | WO-2020006059 A1 * | 1/2020 | ........... H04L 5/0023 |

\* cited by examiner

UPLINK TRANSMISSION METHOD AND APPARATUS, DEVICE, AND STORAGE MEDIUM

CROSS-REFERENCE TO RELATED APPLICATIONS

This disclosure is a continuation application of International Application No. PCT/CN2021/072125 filed on Jan. 15, 2021, which claims priority to Chinese Patent Application No. 202010075783.5, filed in China on Jan. 22, 2020, which are incorporated herein by reference in their entireties.

TECHNICAL FIELD

Embodiments of this disclosure relate to the communications field, and in particular, to an uplink transmission method and apparatus, a device, and a storage medium.

BACKGROUND

With development of mobile communications technologies, a mobile communications system can support more services. To meet requirements of different services for performance indicators such as a throughput, a delay, and reliability, higher requirements are posed on implementation of a network device such as a base station, and a terminal device. Requirements posed on the network device and user equipment include that uplink transmission performance should be ensured.

Currently, the network device may perform joint channel estimation to ensure uplink transmission performance. However, reliability and flexibility of the joint channel estimation currently performed by the network device are poor.

SUMMARY

An embodiment of this disclosure provides an uplink transmission method.

According to a first aspect, an embodiment of this disclosure provides an uplink transmission method, applied to a terminal device. The method includes:
  receiving indication information sent by a network device, where the indication information is used to indicate that a plurality of first uplink transmissions satisfy a quasi co-location relationship; and
  performing the plurality of first uplink transmissions based on the indication information.

According to a second aspect, an embodiment of this disclosure provides an uplink transmission method, applied to a network device. The method includes:
  sending indication information to a terminal device, where the indication information is used to indicate that a plurality of first uplink transmissions satisfy a quasi co-location relationship, so that the terminal device performs the plurality of first uplink transmissions based on the indication information.

According to a third aspect, an embodiment of this disclosure provides an uplink transmission apparatus, applied to a terminal device. The apparatus includes:
  an indication information receiving module, configured to receive indication information sent by a network device, where the indication information is used to indicate that a plurality of first uplink transmissions satisfy a quasi co-location relationship; and
  an uplink transmission module, configured to perform the plurality of first uplink transmissions based on the indication information.

According to a fourth aspect, an embodiment of this disclosure provides an uplink transmission apparatus, applied to a network device. The apparatus includes:
  an indication information sending module, configured to send indication information to a terminal device, where the indication information is used to indicate that a plurality of first uplink transmissions satisfy a quasi co-location relationship, so that the terminal device performs the plurality of first uplink transmissions based on the indication information.

According to a fifth aspect, an embodiment of this disclosure provides a terminal device, including a processor, a memory, and a computer program stored in the memory and capable of running on the processor. When the computer program is executed by the processor, steps of the foregoing uplink transmission method are implemented.

According to a sixth aspect, an embodiment of this disclosure provides a network device, including a processor, a memory, and a computer program stored in the memory and capable of running on the processor. When the computer program is executed by the processor, steps of the foregoing uplink transmission method are implemented.

According to a seventh aspect, an embodiment of this disclosure provides a computer-readable storage medium. The computer-readable storage medium stores a computer program, and when the computer program is executed by a processor, steps of the foregoing uplink transmission method are implemented.

According to an eighth aspect, an embodiment of this disclosure provides a computer program product. When the computer program product is executed by at least one processor, steps of the uplink transmission method according to the first aspect or steps of the uplink transmission method according to the second aspect are implemented.

According to a ninth aspect, an embodiment of this disclosure provides a communications device. The communications device is configured to perform steps of the uplink transmission method according to the first aspect or steps of the uplink transmission method according to the second aspect.

In the embodiments of this disclosure, the network device indicates, to the terminal device, that the plurality of first uplink transmissions satisfy the quasi co-location relationship. The terminal device performs the uplink transmissions based on the indication of the network device. Therefore, the uplink transmissions of the terminal device can satisfy power consistency and/or phase continuity, so that the network device can perform joint channel estimation. In this case, reliability and flexibility of uplink transmission channel estimation can be improved. Therefore, reception performance of the network device is improved.

DESCRIPTION OF EMBODIMENTS

The following clearly describes the technical solutions in the embodiments of this disclosure with reference to the accompanying drawings in the embodiments of this disclosure. Apparently; the described embodiments are some but not all of the embodiments of this disclosure. All other embodiments obtained by a person of ordinary skill in the art based on the embodiments of this disclosure without creative efforts shall fall within the protection scope of this disclosure.

As described in the background, a network device may perform channel estimation to ensure uplink transmission performance. The network device may perform joint channel estimation on demodulation reference signals (DMRS) in transmission resources on a plurality of physical uplink shared channels (PUSCH). To support joint channel estimation, it is necessary to ensure phase consistency and/or power consistency of PUSCHs and DMRSs transmitted at different times.

If transmit power of a transmitter of a terminal device changes at different times, continuity of phases of signals sent by the terminal device at different times cannot be ensured, and a receiver of the network device cannot use the DMRSs at different times for channel estimation. For example, the network can only use a DMRS in a scheduled PUSCH time-frequency resource (for example, a slot) for channel estimation, and cannot use DMRSs in a plurality of continuously scheduled PUSCH time-frequency resources for joint channel estimation.

If transmission resources on a plurality of PUSCHs of the terminal device are discontinuous in time, that is, there is a gap) between the transmission resources on the plurality of PUSCHs, phase continuity of the plurality of PUSCHs cannot be ensured. In this case, the network device cannot perform joint channel estimation.

If the terminal device works in a carrier aggregation (CA) or dual-connectivity (DC) mode, the terminal device cannot ensure consistency of total transmit power at different times, and cannot ensure consistency of phases of signals sent at different times. In this case, the network device cannot perform joint channel estimation.

Figure 1:
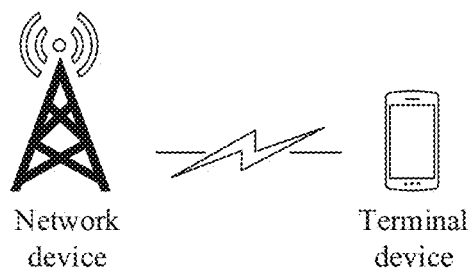
FIG. 1 is an architectural diagram of an embodiment of a communications system for implementing an uplink transmission method according to this disclosure.

Based on the foregoing content, to ensure that a network device can perform joint channel estimation and to improve reliability and flexibility of uplink transmission channel estimation, this disclosure provides an uplink transmission method in an embodiment. FIG. 1 is an architectural diagram of an embodiment of a communications system for implementing an uplink transmission method according to this disclosure. As shown in FIG. 1, the communications system includes a network device and a terminal device, and communication can be performed between the network device and the terminal device.

Figure 2:
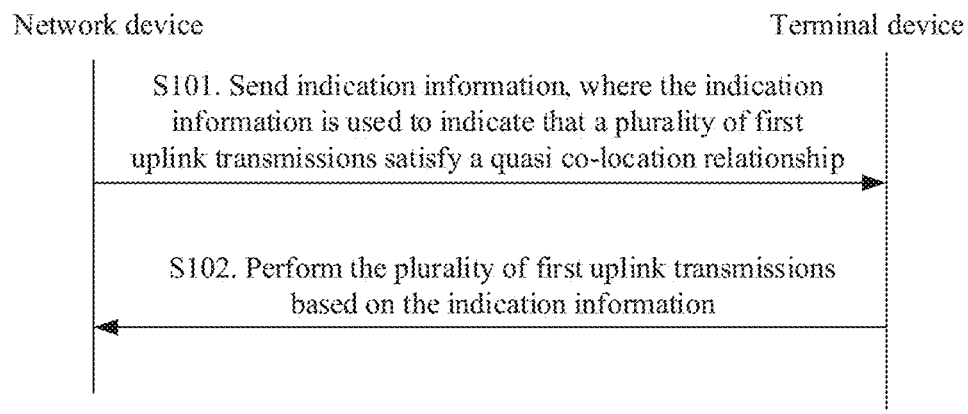
FIG. 2 is a schematic interaction diagram of an embodiment of an uplink transmission method according to this disclosure.

Based on the architectural diagram of the communications system shown in FIG. 1, FIG. 2 is a schematic interaction diagram of an embodiment of an uplink transmission method according to an embodiment of this disclosure. As shown in FIG. 2, the uplink transmission method includes the following steps.

S101. A network device sends indication information to a terminal device, where the indication information is used to indicate that a plurality of first uplink transmissions satisfy a quasi co-location (QCL) relationship.

S102. The terminal device receives the indication information, and performs the plurality of first uplink transmissions based on the indication information.

The network device may include a base station, and the terminal device may include user equipment (UE).

In this embodiment of this disclosure, the network device indicates, to the terminal device, that the plurality of first uplink transmissions satisfy the quasi co-location relationship. The terminal device performs the uplink transmissions based on the indication of the network device. Therefore, the uplink transmissions of the terminal device can satisfy power consistency and; or phase continuity, so that the network device can perform joint channel estimation. In this case, reliability and flexibility of uplink transmission channel estimation can be improved. Therefore, reception performance of the network device is improved.

In one or more embodiments of this disclosure, the quasi co-location relationship includes at least one of the following: an average gain, a delay spread, an average delay, power consistency, and phase continuity.

In one or more embodiments of this disclosure, the indication information is carried by higher layer signaling and/or downlink control information (DCI).

In one or more embodiments of this disclosure, an uplink transmission in the plurality of first uplink transmissions includes an uplink physical channel and/or an uplink physical signal;

the uplink physical channel includes at least one of the following: a physical uplink shared channel (PUSCH), a physical uplink control channel (PUCCH), and a physical random access channel (PRACH); and the uplink physical signal includes at least one of the following: a sounding reference signal (SRS), a PUSCH DMRS, a PUCCH DMRS, and a PUSCH phase tracking reference signal (PTRS).

In one or more embodiments of this disclosure, the plurality of first uplink transmissions may include a plurality of uplink physical channels, where the plurality of uplink physical channels may be of a same type or different types.

In one or more embodiments of this disclosure, the plurality of first uplink transmissions include a plurality of uplink physical signals, where the plurality of uplink physical signals may be of a same type or different types.

In one or more embodiments of this disclosure, the plurality of first uplink transmissions include at least one of the following:
 a plurality of uplink physical channels of a same type;
 a plurality of uplink physical channels of different types;
 a plurality of uplink physical signals of a same type; and
 a plurality of uplink physical signals of different types.

In one or more embodiments of this disclosure, the plurality of first uplink transmissions include at least one of the following
 a plurality of uplink physical channels of a same type, where the plurality of uplink physical channels transmit different content;
 a plurality of uplink physical channels of a same type, where the plurality of uplink physical channels transmit repeated content;
 a plurality of uplink physical channels of different types;
 a plurality of uplink physical signals of a same type, where the plurality of uplink physical signals transmit different content;
 a plurality of uplink physical signals of a same type, where the plurality of uplink physical signals transmit repeated content;
 a plurality of uplink physical signals of different types;
 a plurality of uplink physical channels of different types and a plurality of uplink physical signals of different types, where the plurality of uplink physical channels transmit different content, and the plurality of uplink physical signals transmit different content; and
 a plurality of uplink physical channels of different types and a plurality of uplink physical signals of different types, where the plurality of uplink physical channels transmit repeated content, and the plurality of uplink physical signals transmit repeated content.

The following uses several examples to describe this embodiment of this disclosure.

In an example, the indication information indicates that four PUSCHs satisfy a quasi co-location relationship, and the four PUSCHs are uplink physical channels of a same type. Transmission content of the four PUSCHs may include the following three cases:

Case 1: The transmission content of the four PUSCHs is the same, and the transmissions are mutually repeated transmissions.

Case 2: The transmission content of the four PUSCHs is completely different, and the transmissions are mutually different transmissions. For example, the four PUSCHs transmit four different transport blocks (TB).

Case 3: Transmission content of some of the four PUSCHs is the same. For example, the first PUSCH and the second PUSCH transmit the same TB, and the transmissions are repeated transmissions; the third PUSCH transmits uplink control information (UCI), and the fourth PUSCH transmits another TB.

In another example, the indication information indicates that one PUSCH, one PUCCH, and one PRACH satisfy a quasi co-location relationship, and the PUSCH, PUCCH, and PRACH are three uplink physical channels of different types.

In still another example, the indication information indicates that four DMRSs satisfy a quasi co-location relationship, and the four DMRSs are uplink physical signals of a same type. Transmission content of the four DMRSs may be the same or different, or transmission content of some DMRSs is the same.

In yet another example, the indication information indicates that one DMRS, one SRS, and one PTRS satisfy a quasi co-location relationship, and the three signals are uplink physical signals of different types.

In yet another example, the indication information indicates that one PUSCH, a DMRS corresponding to the PUSCH, one PUCCH, and a DMRS corresponding to the PUCCH satisfy a quasi co-location relationship. The PUSCH and PUCCH are uplink physical channels of different types. The DMRS corresponding to the PUSCH and the DMRS corresponding to the PUCCH transmit different content.

In one or more embodiments of this disclosure, the indication information is further used to indicate that a plurality of second uplink transmissions satisfy a quasi co-location relationship; and
 the performing the plurality of first uplink transmissions based on the indication information includes:
 performing the plurality of first uplink transmissions and the plurality of second uplink transmissions based on the indication information.

In an example, the indication information indicates that a PUSCH 1 to a PUSCH 3 satisfy a quasi co-location relationship, and indicates that a PUSCH 5 to a PUSCH 7 satisfy a quasi co-location relationship. Therefore, based on the indication information, the terminal device transmits the PUSCH 1 to the PUSCH 3, and transmits the PUSCH 5 to the PUSCH 7.

In one or more embodiments of this disclosure, the plurality of first uplink transmissions are continuous on time-frequency resources, and the plurality of second uplink transmissions are continuous on time-frequency resources. The plurality of first uplink transmissions and the plurality of second uplink transmissions may be continuous or discontinuous on time-frequency resources.

In one or more embodiments of this disclosure, the plurality of second uplink transmissions and the plurality of first uplink transmissions satisfy a quasi co-location relationship.

For example, the indication information indicates that the PUSCH 1 to the PUSCH 3 satisfy a quasi co-location relationship, and indicates that the PUSCH 5 to the PUSCH 7 satisfy a quasi co-location relationship. The PUSCH 1 to the PUSCH 3 and the PUSCH 5 to the PUSCH 7 satisfy a quasi co-location relationship.

In one or more embodiments of this disclosure, S102 includes:

performing a plurality of parts of uplink transmissions based on the indication information and based on a quasi co-location relationship satisfied by ach of the plurality of parts, where the plurality of parts are a plurality of parts formed by the plurality of first uplink transmissions, and each part includes at least one first uplink transmission.

In one or more embodiments of this disclosure, the performing a plurality of parts of uplink transmissions based on the indication information and based on a quasi co-location relationship satisfied by each of the plurality of parts includes: performing the plurality of parts of uplink transmissions based on the indication information and based on the quasi co-location relationship satisfied by each part and a quasi co-location relationship between the plurality of parts.

For example, the indication information indicates that a DMRS corresponding to a PUSCH 0 to a DMRS corresponding to the PUSCH 5 satisfy a quasi co-location relationship. Because a time-frequency resource for transmitting the PUSCH 3 collides signal, for example, some higher-priority signals, the terminal device cancels the transmission of the PUSCH 3. Therefore, the DMRS corresponding to the PUSCH 0 to the DMRS corresponding to the PUSCH 5 are divided into two parts. The first part is the DMRS corresponding to the PUSCH 0 to a DMRS corresponding to the PUSCH 2. The second part is a DMRS corresponding to the PUSCH 4 and the DMRS corresponding to the PUSCH 5.

In this case, the terminal device performs uplink transmissions on a basis that the DMRS corresponding to the PUSCH 0 to the DMRS corresponding to the PUSCH 2 satisfy a quasi co-location relationship, and that the DMRS corresponding to the PUSCH 4 and the DMRS corresponding to the PUSCH 5 satisfy a quasi co-location relationship.

The DMRS corresponding to the PUSCH 0 to the DMRS corresponding to the PUSCH 2 and the DMRS corresponding to the PUSCH 4 and the DMRS corresponding to the PUSCH 5 may satisfy a quasi co-location relationship.

In one or more embodiments of this disclosure, each of the plurality of parts may be a continuous uplink transmission on time-frequency resources. The plurality of parts may be continuous or discontinuous on time-frequency resources.

In one or more embodiments of this disclosure, S102 includes: performing the plurality of first uplink transmissions on a first serving cell based on the indication information, and skipping performing an uplink transmission on a second serving cell other than the first serving cell.

In one or more embodiments of this disclosure, the first serving cell is a primary serving cell (PCell) or a primary secondary cell (PSCell).

In one or more embodiments of this disclosure, the skipping performing an uplink transmission on a second serving cell other than the first serving cell includes:

skipping performing, on the second serving cell, an uplink transmission configured by radio resource control (RRC) signaling;
and/or
skipping performing, on the second serving cell, an uplink transmission indicated by DCI.

In one or more embodiments of this disclosure, S102 includes:

performing, on every orthogonal frequency division multiplexing (OFDM) symbol for the plurality of first uplink transmissions, the plurality of first uplink transmissions by using first power.

In one or more embodiments of this disclosure, the first power is maximum transmit power in the plurality of first uplink transmissions, minimum transmit power in the plurality of first uplink transmissions, or average transmit power in the plurality of first uplink transmissions.

The maximum transmit power and minimum transmit power are transmit power obtained through calculation by using a power control formula. Based on the indication information, the terminal device further needs to perform power scaling by using the first power, and then perform the plurality of first uplink transmissions.

The uplink transmission method provided by this disclosure is hereinafter further described by using several embodiments.

In an embodiment, a network device sends indication information to a terminal device, where the indication information indicates that a plurality of uplink transmissions of the terminal device satisfy a QCL relationship. The plurality of uplink transmissions include a plurality of uplink physical channels of a same type, and the plurality of uplink physical channels respectively transmit different content. All of the plurality of uplink physical channels are PUSCHs. The terminal device receives the indication information sent by the network device, and performs the plurality of uplink transmissions based on the indication information.

The indication information may include the following cases.

Figure 3A:
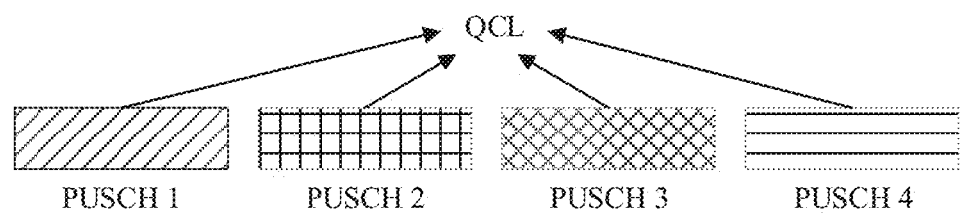
FIG. 3(*a*) to FIG. 3(*e*) are schematic diagrams of an embodiment in which a plurality of uplink transmissions satisfy a quasi co-location relationship according to this disclosure.

As shown in FIG. 3(a), the indication information indicates that a PUSCH 1 to a PUSCH 4 satisfy a QCL relationship.

Figure 3B:
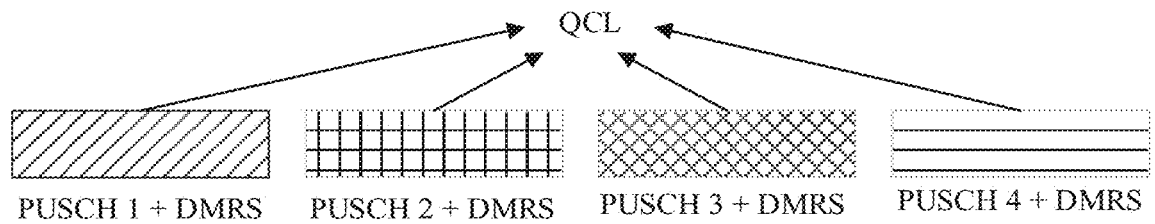

As shown in FIG. 3(b), the indication information indicates that a PUSCH 1 to a PUSCH 4 and DMRSs corresponding to the PUSCH 1 to the PUSCH 4 satisfy a QCL relationship.

Figure 3C:
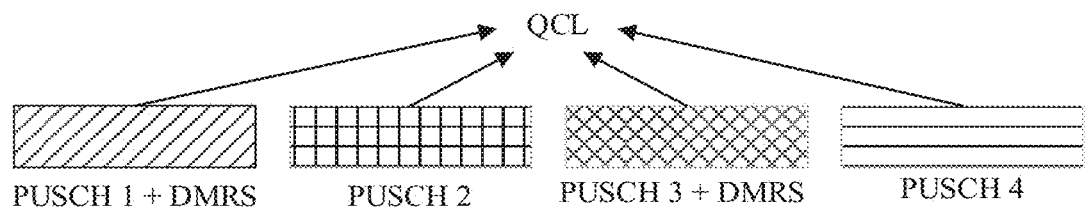

As shown in FIG. 3(c), the indication information indicates that a PUSCH 1 to a PUSCH 4 and DMRSs corresponding to the PUSCH 1 and the PUSCH 3 satisfy a QCL relationship.

Figure 3D:
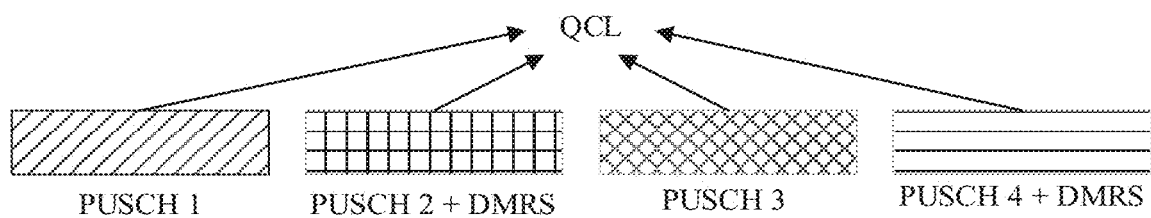

As shown in FIG. 3(d), the indication information indicates that a PUSCH 1 to a PUSCH 4 and DMRSs corresponding to the PUSCH 2 and the PUSCH 4 satisfy a QCL relationship.

Figure 3E:
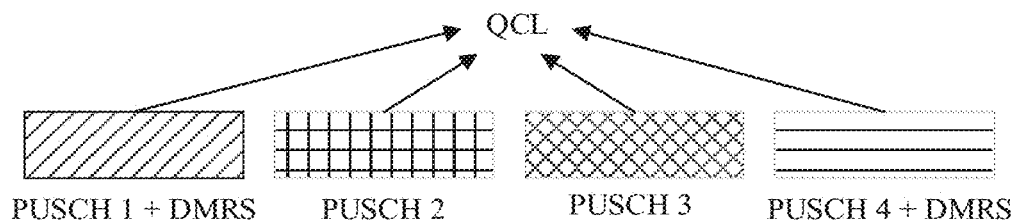

As shown in FIG. 3(e), the indication information indicates that a PUSCH 1 to a PUSCH 4 and DMRSs corresponding to the PUSCH 1 and the PUSCH 4 satisfy a QCL relationship.

In any one of the examples shown in FIG. 3(a) to FIG. 3(e), the PUSCH 1 to the PUSCH 4 are uplink physical channels of a same type, and the four PUSCHs transmit different content respectively. The terminal device performs transmissions on every OFDM symbol of the four PUSCHs by using same transmit power. Optionally, the transmit power of the terminal device on every OFDM symbol of the four PUSCHs is a maximum value, a minimum value, or an average value of initial power on the four PUSCHs.

In any one of the examples shown in FIG. 3(a) to FIG. 3(e), the PUSCH to the PUSCH 4 are uplink physical channels of a same typesame uplink physical channels, that is, all of the PUSCH 1 to the PUSCH 4 are PUSCHs.

In another embodiment, a network device may schedule a terminal device to perform repeated transmissions on continuous PUSCH resources, and a quantity of repeated transmissions may be configured by higher layer signaling, or dynamically indicated by DCI.

Based on this, the network device may send indication information to the terminal device, where the indication information indicates that a plurality of uplink transmissions of the terminal device satisfy a QCL relationship. The plurality of uplink transmissions include a plurality of uplink physical channels of a same type, and the plurality of uplink physical channels repeatedly transmit same content. The terminal device receives the indication information sent by the network device, and performs the plurality of uplink transmissions based on the indication information.

The indication information may include the following cases.

Figure 4A:
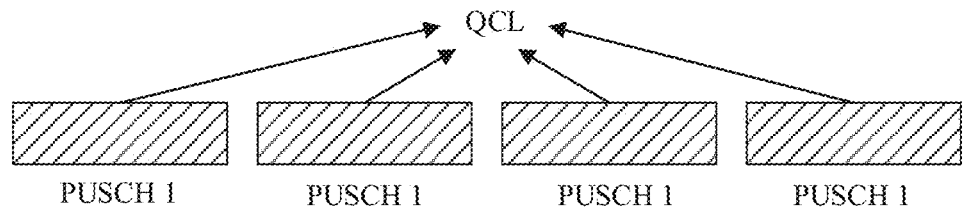
FIG. 4(a) to FIG. 4(e) are schematic diagrams of another embodiment in which a plurality of uplink transmissions satisfy a quasi co-location relationship according to this disclosure.

As shown in FIG. 4(a), the indication information indicates that four repeatedly transmitted PUSCHs 1 satisfy a QC, relationship.

Figure 4B:
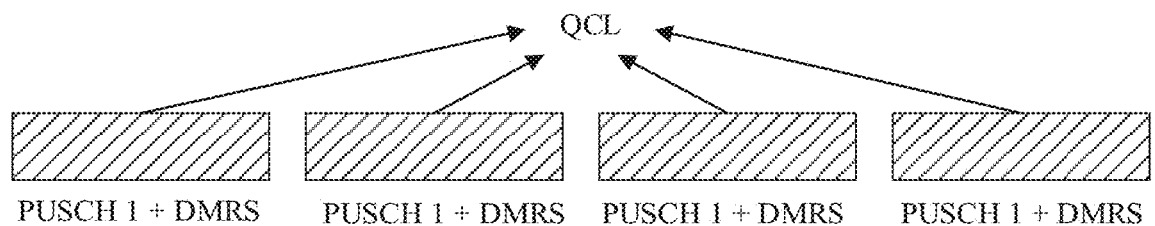

As shown in FIG. 4(b), the indication information indicates that the four repeatedly transmitted PUSCHs 1 and DMRSs corresponding to the four PUSCHs 1 satisfy a QCL relationship.

Figure 4C:
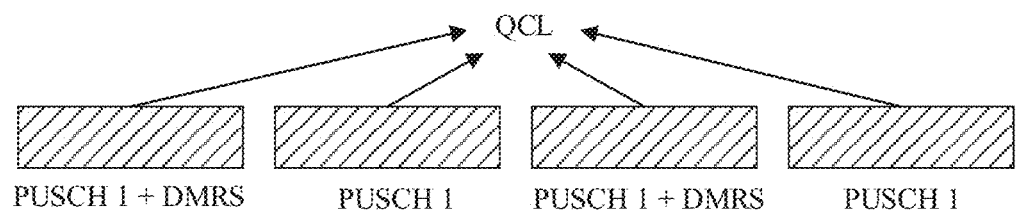

As shown in FIG. 4(c), the indication information indicates that the four repeatedly transmitted PUSCHs 1 and DMRSs corresponding to the first PUSCH 1 and third PUSCH 1 satisfy a QCL relationship.

Figure 4D:
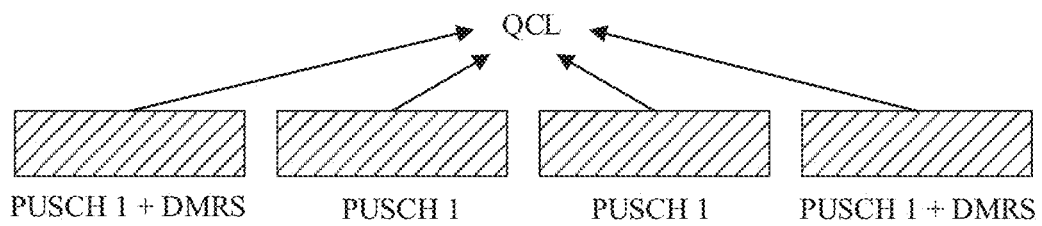

As shown in FIG. 4(d), the indication information indicates that the four repeatedly transmitted PUSCHs 1 and DMRSs corresponding to the first PUSCH 1 and fourth PUSCH 1 satisfy a QCL relationship.

Figure 4E:
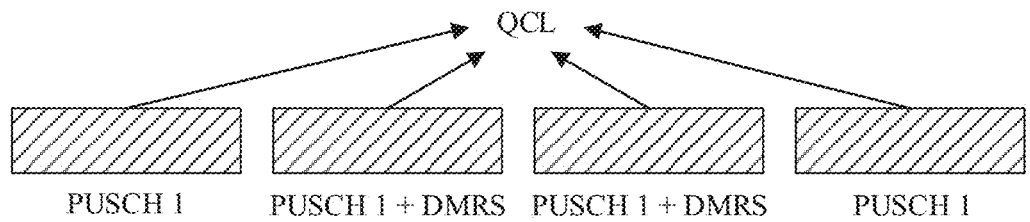

As shown in FIG. 4(e), the indication information indicates that the four repeatedly transmitted PUSCHs 1 and DMRSs corresponding to the second PUSCH 1 and third PUSCH 1 satisfy a QCL relationship.

In any one of the examples shown in FIG. 4(a) to FIG. 4(e), the four PUSCHs 1 transmit same content. The terminal device performs transmissions on every OFDM symbol of the four PUSCHs 1 by using same transmit power. Optionally, the transmit power of the terminal device on every OFDM symbol of the four PUSCHs 1 is a maximum value, a minimum value, or an average value of initial power on the four PUSCHs 1.

In still another embodiment, a network device may send indication information to a terminal device, where the indication information indicates that a plurality of uplink transmissions of the terminal device satisfy a QCL relationship.

The plurality of uplink transmissions include a plurality of PUSCHs 1 repeatedly transmitting same content, and a plurality of PUSCHs 2 repeatedly transmitting same content, and content transmitted by the PUSCHs 1 is different from content transmitted by the PUSCHs 2. The terminal device receives the indication information sent by the network device, and performs the plurality of uplink transmissions based on the indication information.

The indication information may include the following cases.

Figure 5A:
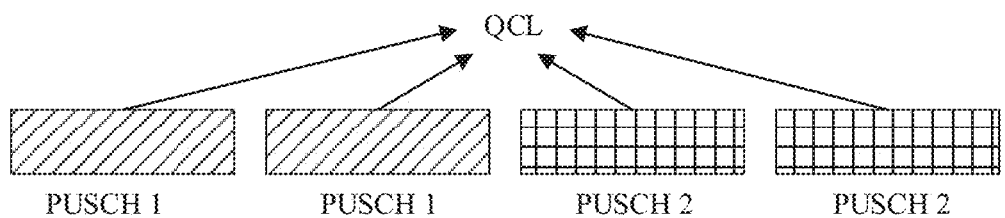
FIG. 5(a) to FIG. 5(e) are schematic diagrams of still another embodiment in which a plurality of uplink transmissions satisfy a quasi co-location relationship according to this disclosure.

As shown in FIG. 5(a), the indication information indicates that two repeatedly transmitted. PUSCHs 1 and two repeatedly transmitted PUSCHs 2 satisfy a QCL relationship.

Figure 5B:
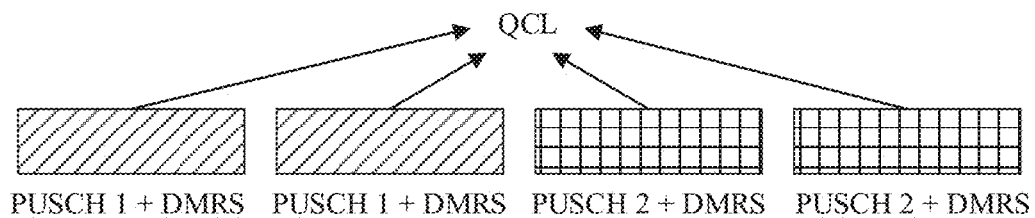

As shown in FIG. 5(b), the indication information indicates that two repeatedly transmitted PUSCHs 1, two repeatedly transmitted PUSCHs 2, DMRSs corresponding to the two PUSCHs 1, and DMRSs corresponding to the two PUSCHs 2 satisfy a QCL relationship.

Figure 5C:
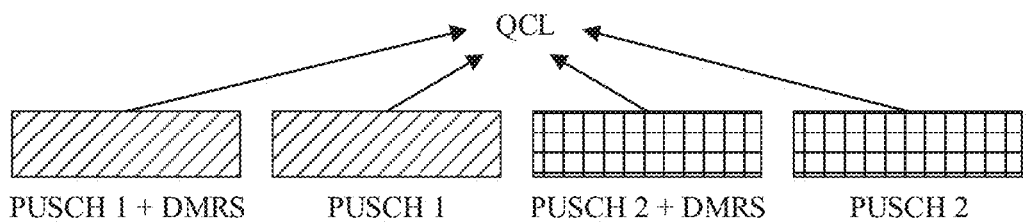

As shown in FIG. 5(c), the indication information indicates that two repeatedly transmitted PUSCHs 1, two repeatedly transmitted PUSCHs 2, a DMRS corresponding to the first PUSCH 1, and a DMRS corresponding to the first PUSCH 2 satisfy a QCL relationship.

Figure 5D:
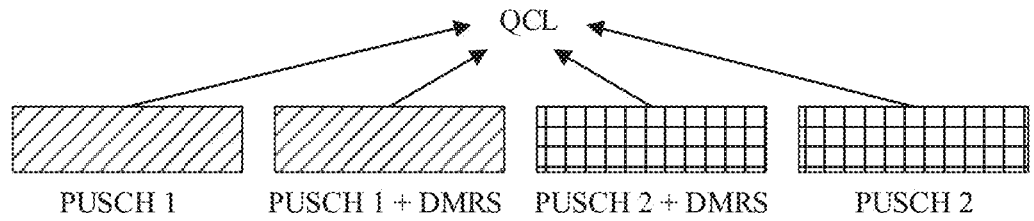

As shown in FIG. 5(d), the indication information indicates that two repeatedly transmitted PUSCHs 1, two repeatedly transmitted PUSCHs 2, a DMRS corresponding to the second PUSCH 1, and a DMRS corresponding to the first PUSCH 2 satisfy a QCL relationship.

Figure 5E:
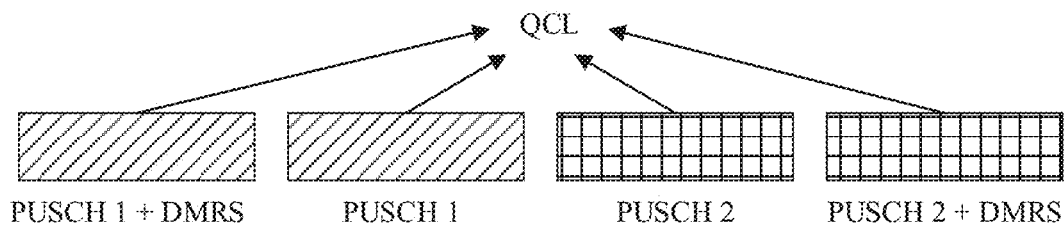

As shown in FIG. 5(e), the indication information indicates that two repeatedly transmitted PUSCHs 1, two repeatedly transmitted PUSCHs 2, a DMRS corresponding to the first PUSCH 1, and a DMRS corresponding to the second PUSCH 2 satisfy a QCL relationship.

In any one of the examples shown in FIG. 5(a) to FIG. 5(e), the PUSCHs 1 and the PUSCHs 2 are same uplink physical channels.

In any one of the examples shown in FIG. 5(a) to FIG. 5(e), the terminal device performs transmissions on every OFDM symbol of the two PUSCHs 1 and every OFDM symbol of the two PUSCHs 2 by using same transmit power. Optionally, the transmit power of the terminal device on every OFDM symbol of the two PUSCHs 1 and every OFDM symbol of the two PUSCHs 2 is a maximum value, a minimum value, or an average value of initial power on the two PUSCHs 1 and the two PUSCHs 2.

In yet another embodiment, a network device may send indication information to a terminal device, where the indication information indicates that a plurality of uplink transmissions of the terminal device satisfy a QCL relationship. The plurality of uplink transmissions include a plurality of PUCCHs and a plurality of PUSCHs. The plurality of PUCCHs repeatedly transmit same content, and the plurality of PUSCHs transmit different content. The terminal device receives the indication information sent by the network device, and performs the plurality of uplink transmissions based on the indication information.

The indication information may include the following cases.

Figure 6A:
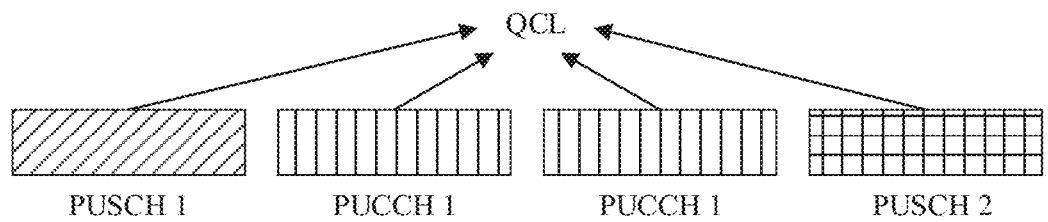
FIG. 6(a) to FIG. 6(e) are schematic diagrams of yet another embodiment in which a plurality of uplink transmissions satisfy a quasi co-location relationship according to this disclosure.

As shown in FIG. 6(a), the indication information indicates that two repeatedly transmitted PUCCHs 1 and two PUSCHs 1 and 2 transmitting different content satisfy a QCL relationship.

Figure 6B:
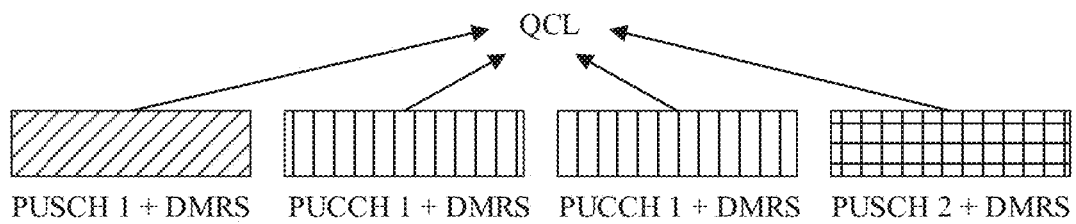

As shown in FIG. 6(b), the indication information indicates that two repeatedly transmitted PUCCHs 1, two PUSCHs 1 and 2 transmitting different content, DMRSs corresponding to the two PUCCHs 1, a DMRS corresponding to the PUSCH 1, and a DMRS corresponding to the PUSCH 2 satisfy a QCL relationship.

Figure 6C:
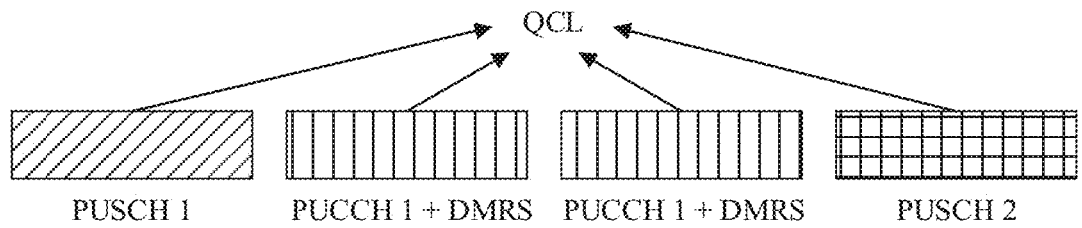

As shown in FIG. 6(c), the indication information indicates that two repeatedly transmitted PUCCHs 1, two PUSCHs 1 and 2 transmitting different content, and DMRSs corresponding to the two PUCCHs 1 satisfy a QCL relationship.

Figure 6D:
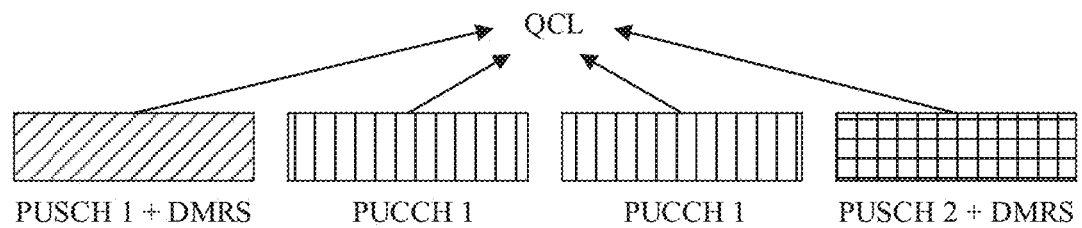

As shown in FIG. 6(d), the indication information indicates that two repeatedly transmitted PUCCHs 1, two PUSCHs 1 and 2 transmitting different content, a DMRS corresponding to the PUSCH 1, and a DMRS corresponding to the PUSCH 2 satisfy a QCL relationship.

Figure 6E:
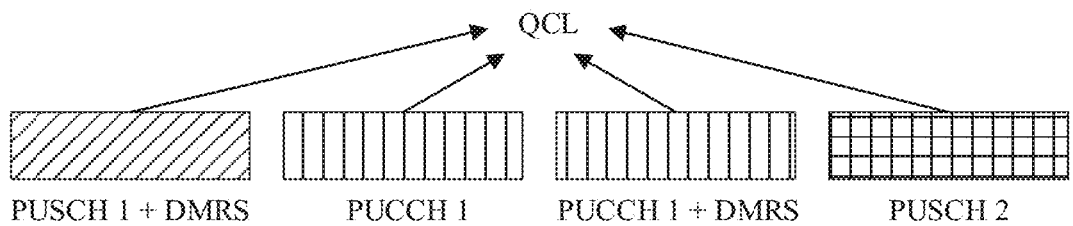

As shown in FIG. 6(e), the indication information indicates that two repeatedly transmitted PUCCHs 1, two PUSCHs 1 and 2 transmitting different content, a DMRS corresponding to the second PUCCH 1 and a DMRS corresponding to the PUSCH 1 satisfy a QCL relationship.

In any one of the examples shown in FIG. 6(a) to FIG. 6(e), the PUSCH 1 and the PUSCH 2 are physical uplink channels of a same type. The PUCCH 1 and the PUSCH 1 are physical uplink channels of different types. The PUCCH 1 and the PUSCH 2 are physical uplink channels of different types.

In any one of the examples shown in FIG. 6(a) to FIG. 6(e), the terminal device performs transmissions on every OFDM symbol of the two PUCCHs 1, the PUTSCH 1, and the PUSCH 2 by using same transmit power. Optionally, the transmit power of the terminal device on every OFDM symbol is a maximum value, a minimum value, or an average value of initial power on the two PUCCHs 1, the PUSCH 1, and the PUSCH 2.

In yet another embodiment, a network device may send indication information to a terminal device, where the indication information indicates that a plurality of uplink transmissions of the terminal device satisfy a QCL relationship. The plurality of uplink transmissions include one SRS, one PUCCH, and two PUSCHs. The two PUSCHs transmit different content. The terminal device receives the indication information sent by the network device, and performs the plurality of uplink transmissions based on the indication information.

The indication information may include the following cases.

Figure 7A:
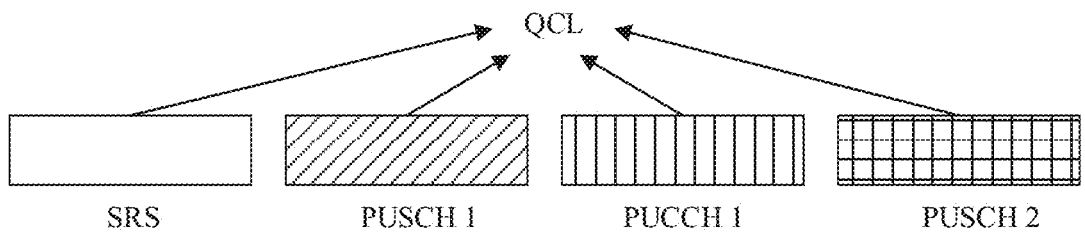
FIG. 7(a) to FIG. 7(e) are schematic diagrams of yet another embodiment in which a plurality of uplink transmissions satisfy a quasi co-location relationship according to this disclosure.

As shown in FIG. 7(a), the indication information indicates that an SRS, a PUCCH 1, a PUSCH 1, and a PUSCH 2 satisfy a QCL relationship.

Figure 7B:
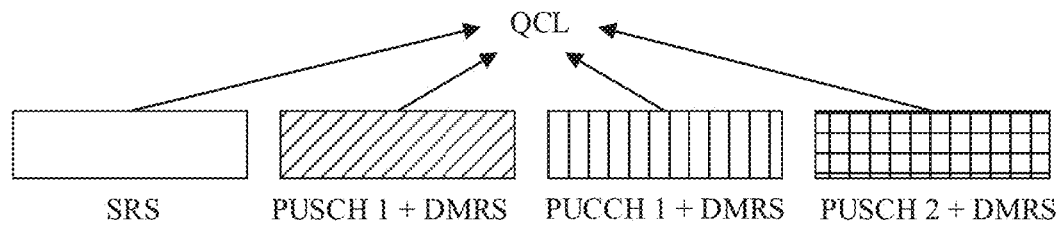

As shown in FIG. 7(b), the indication information indicates that an SRS, a PUCCH 1, a PUTSCH 1, a PUSCH 2, a DIMS corresponding to the PUCCH 1, a DMRS corresponding to the PUSCH 1, and a DMRS corresponding to the PUSCH 2 satisfy a QCL relationship.

Figure 7C:
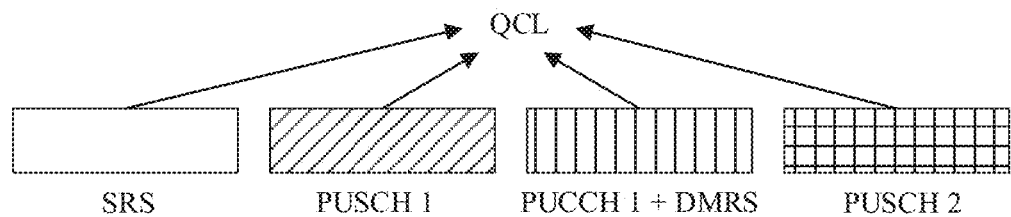

As shown in FIG. 7(c), the indication information indicates that an SRS, a PUCCH 1, a PUSCH 1, a PUSCH 2, and a DMRS corresponding to the PUCCH 1 satisfy a QCL relationship.

Figure 7D:
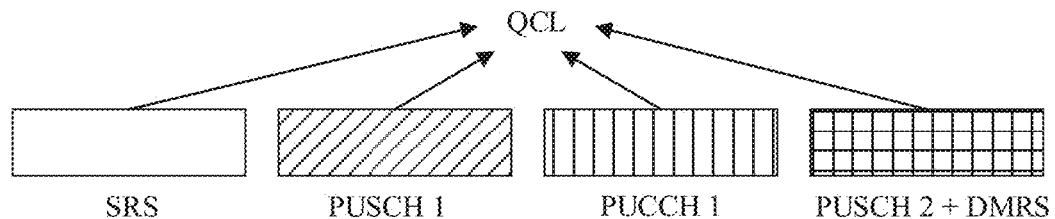

As shown in FIG. 7(d), the indication information indicates that an SRS, a PUCCH 1, a PUSCH 1, a PUSCH 2, and a DMRS corresponding to the PUSCH 2 satisfy a QCL relationship.

Figure 7E:
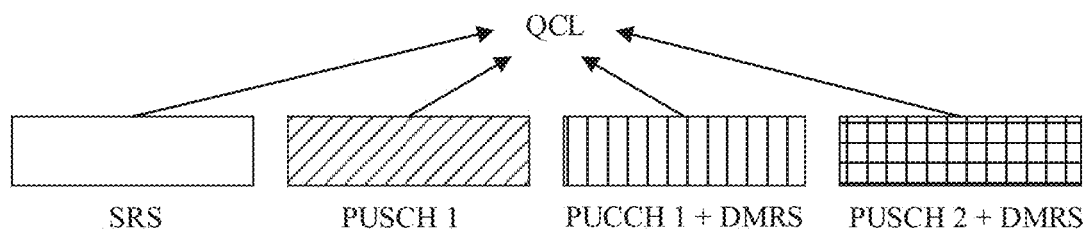

As shown in FIG. 7(e), the indication information indicates that an SRS, a PUCCH 1, a PUSCH 1, a PUSCH 2, a DMRS corresponding to the PUCCH 1, and a DMRS corresponding to the PUSCH 2 satisfy a QCL relationship.

In any one of the examples shown in FIG. 7(a) to FIG. 7(e), the PUSCH 1 and the PUSCH 2 are physical uplink channels of a same type. The PUCCH 1 and the PUSCH 1 are physical uplink channels of different types. The PUCCH 1 and the PUTSCH 2 are physical uplink channels of different types.

In any one of the examples shown in FIG. 7(a) to FIG. 7(e), the terminal device performs transmissions on every OFDM symbol by using same transmit power. Optionally, the transmit power of the terminal device on every OFDM symbol is a maximum value, a minimum value, or an average value of initial power on the SRS, the PUCCH, the two PUSCHs, and the corresponding DMRSs.

In yet another embodiment, a network device may send indication information to a terminal device, where the indication information indicates that each of a plurality of parts of uplink transmissions satisfies a QCL relationship, and each part includes at least one uplink transmission. The terminal device performs the plurality of parts of uplink transmissions based on the indication information.

Figure 8A:
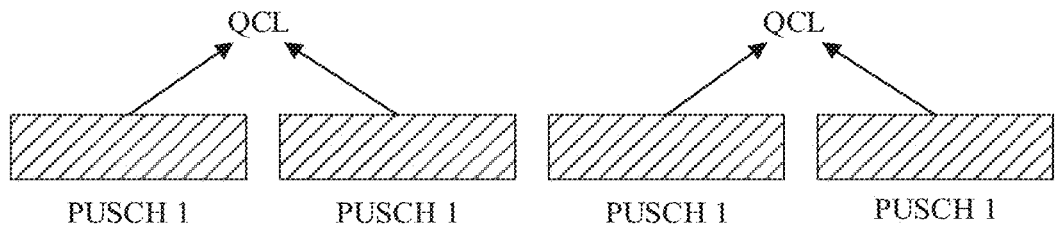
FIG. 8(a) and FIG. 8(b) are schematic diagrams of yet another embodiment in which a plurality of uplink transmissions satisfy a quasi co-location relationship according to this disclosure.

For example, as shown in FIG. 8(a), the indication information indicates that among four repeatedly transmitted PUSCHs 1 the first PUSCH 1 and the second PUSCH 1 satisfy a QCL relationship, and the third PUSCH 1 and the fourth PUSCH 1 satisfy a QCL relationship, where the four PUSCHs 1 transmit same content. The terminal device transmits the four PUSCHs 1 on every OFDM symbol by using same transmit power. Optionally, the transmit power of the terminal device on every OFDM symbol is a maximum value, a minimum value, or an average value of initial power on the four PUSCHs 1.

Further, the indication information further indicates that the plurality of parts satisfy a QCL relationship.

Figure 8B:
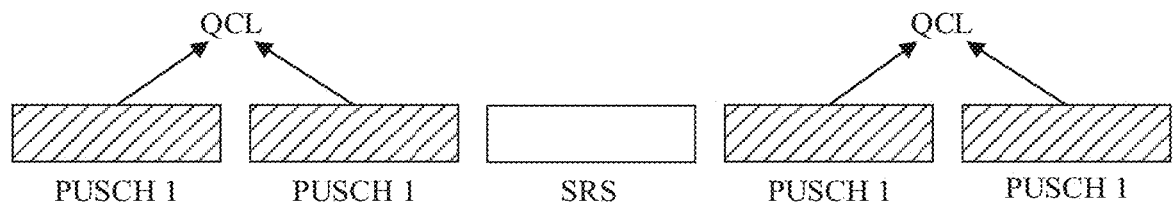

For example, as shown in FIG. 8(b), for four repeatedly transmitted PUSCHs 1, an SRS exists between the first and second PUSCHs 1 and the third and fourth PUSCHs 1. In this case, the indication information indicates that the first PUSCH 1 and the second PUSCH 1 satisfy a QCL relationship, and the third PUSCH 1 and the fourth PUSCH 1 satisfy a QCL relationship.

In the example shown in FIG. 8(a) or FIG. 8(b), the four PUSCHs 1 are uplink physical channels of a same type.

In yet another embodiment, a network device may send indication information to a terminal device, where the indication information indicates that all or part of DMRSs corresponding to four repeatedly transmitted PUSCHs 1 satisfy a QCL relationship. The terminal device performs uplink transmissions of the four repeatedly transmitted PUSCHs 1 based on the indication information.

The indication information may include the following cases.

Figure 9A:
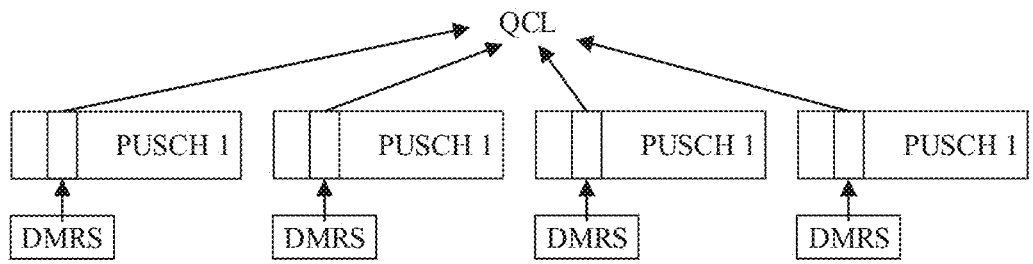
FIG. 9(a) to FIG. 9(e) are schematic diagrams of yet another embodiment in which a plurality of uplink transmissions satisfy a quasi co-location relationship according to this disclosure.

As shown in FIG. 9(a), the indication information indicates that the DMRSs corresponding to the four repeatedly transmitted PUSCHs 1 satisfy a QCL relationship.

Figure 9B:
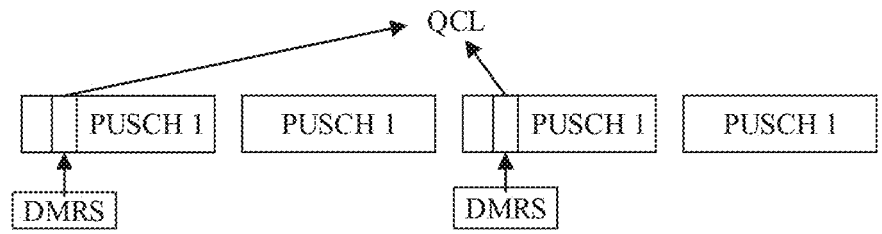

As shown in FIG. 9(b), the indication information indicates that the DMRSs corresponding, to the first PUSCH 1 and the third. PUSCH 1 satisfy a QCL relationship.

Figure 9C:
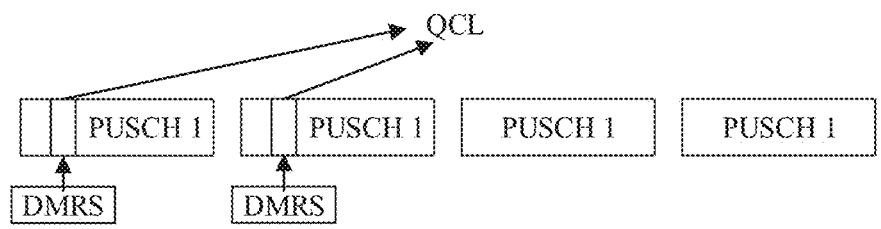

As shown in FIG. 9(c), the indication information indicates that the DMRSs corresponding to the first PUSCH 1 and the second PUSCH 1 satisfy a QCL relationship.

Figure 9D:
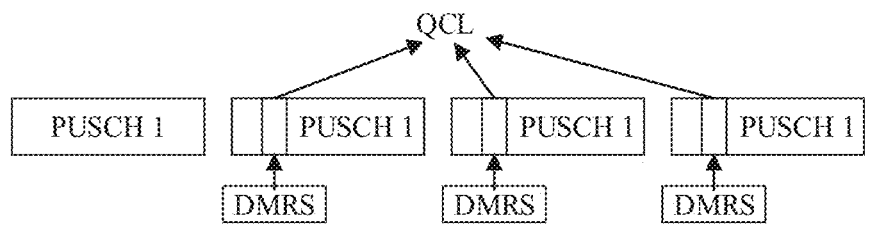

As shown in FIG. 9(d), the indication information indicates that the DMRSs corresponding to the second PUSCH 1 to the fourth PUSCH 1 satisfy a QCL relationship.

Figure 9E:
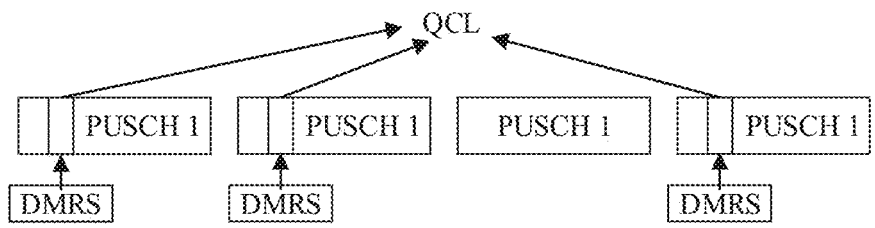

As shown in FIG. 9(e), the indication information indicates that the DMRSs corresponding to the first PUSCH 1, the second PUSCH 1, and the fourth PUSCH 1 satisfy a QCL relationship.

In any one of the examples shown in FIG. 9(a) to FIG. 9(e), the four PUSCHs 1 are a plurality of uplink physical channels of a same type. The DMRS in any one of the examples shown in FIG. 9(a) to FIG. 9(e) not only represents a DMRS on an OFDM symbol, but also can represent all DMRSs on a PUSCH. One PUSCH may include a plurality of DMRSs. In addition, by using same transmit power, the terminal device performs transmissions on OFDM symbols on which DMRS resources are located.

In an example, the transmit power of the terminal device on the OFDM symbols on which the DMRS resources are located may be a maximum value, a minimum value, or an average value of initial power on the DMRS resources indicated by the indication information.

In an example, the transmit power of the terminal device on the OFDM symbols on which the DMRS resources are located may be inconsistent with transmit power of the PUSCH.

In an example, a PUSCH without a DMRS and a repeatedly transmitted PUSCH with a DMRS may use a same antenna port.

In yet another embodiment, a network device may send indication information to a terminal device, where the indication information indicates that all or part of DMRSs corresponding to four PUSCHs transmitting different content satisfy a QCL relationship. Based on the indication information, the terminal device performs uplink transmissions of the four PUSCHs transmitting different content.

The indication information may include the following cases.

Figure 10A:
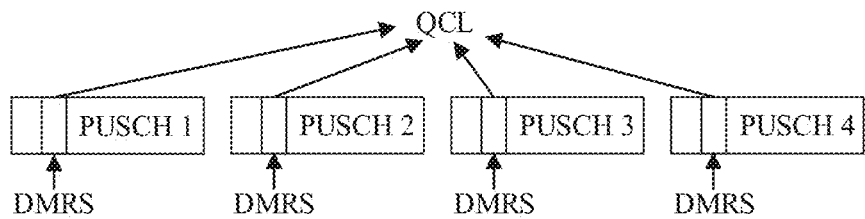
FIG. 10(a) to FIG. 10(d) are schematic diagrams of yet another embodiment in which a plurality of uplink transmissions satisfy a quasi co-location relationship according to this disclosure.

As shown in FIG. 10(a), the indication information indicates that DMRSs corresponding to four PUSCHs 1 to 4 transmitting different content satisfy a QCL relationship.

Figure 10B:
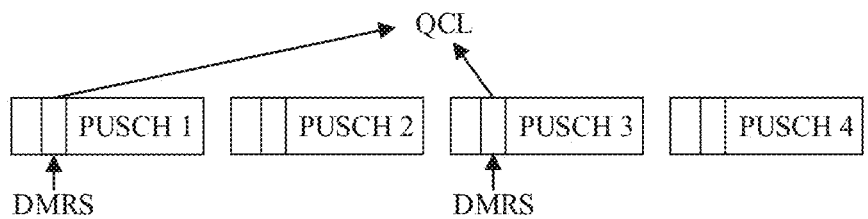

As shown in FIG. 10(b), the indication information indicates that DMRSs corresponding to a PUSCH 1 and a PUSCH 3 satisfy a QCL relationship.

Figure 10C:
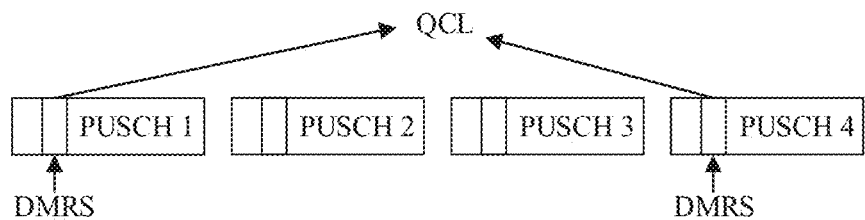

As shown in FIG. 10(c), the indication information indicates that DMRSs corresponding to a PUSCH 1 and a PUSCH 4 satisfy a QCL relationship.

Figure 10D:
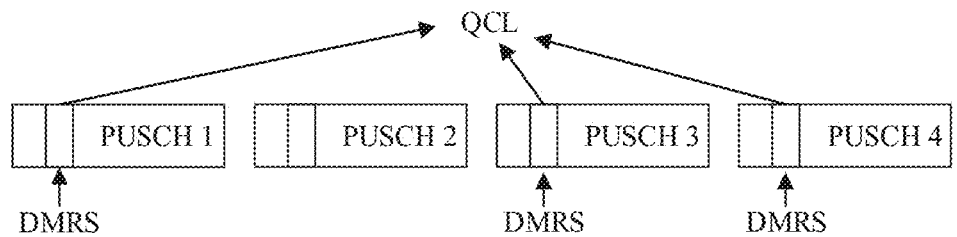

As shown in FIG. 10(d), the indication information indicates that DMRSs corresponding to a PUSCH 1, a PUSCH 3, and a PUSCH 4 satisfy a QCL relationship.

In any one of the examples shown in FIG. 10(a) to FIG. 10(d), the PUSCH 1 to the PUSCH 4 are uplink physical channels of a same type. The DMRS in any one of the examples shown in FIG. 10(a) to FIG. 10(d) not only represents a DMRS on an OFDM symbol, but also can represent all DMRSs on a PUSCH. One PUSCH may include a plurality of DMRSs. In addition, by using same transmit power, the terminal device may perform transmissions on OFDM symbols on which DMRS resources are located.

In an example, the transmit power of the terminal device on the OFDM symbols on which the DMRS resources are located may be a maximum value, a minimum value, or an average value of initial power on the DMRS resources indicated by the indication information.

In an example, the transmit power of the terminal device on the OFDM symbols on which the DMRS resources are located may be inconsistent with transmit power of the PUSCH.

In yet another embodiment, a network device may send indication information to a terminal device, where the indication information indicates that all or part of DMRSs corresponding to two repeatedly transmitted PUCCHs and all or part of DMRSs corresponding to two PUSCHs transmitting different content satisfy a QCL relationship. Based on the indication information, the terminal device performs uplink transmissions of the two repeatedly transmitted PUCCHs and the two PUSCHs transmitting different content.

The indication information may include the following cases.

Figure 11A:
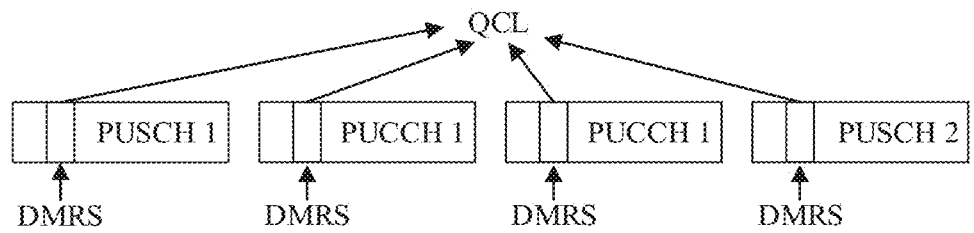
FIG. 11(a) to FIG. 11(d) are schematic diagrams of yet another embodiment in which a plurality of uplink transmissions satisfy a quasi co-location relationship according to this disclosure.

As shown in FIG. 11(a), the indication information indicates that DMRSs corresponding to two repeatedly transmitted PUCCHs 1 and DMRSs corresponding to two PUSCHs 1 and 2 transmitting different content satisfy a QCL relationship.

Figure 11B:
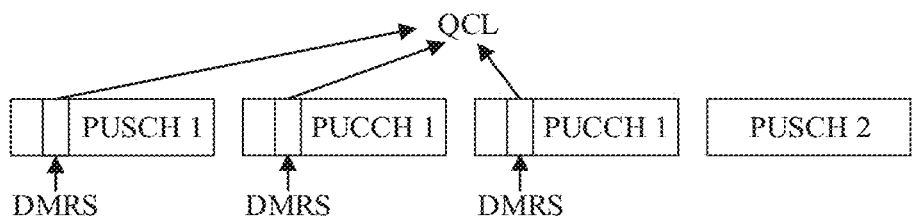

As shown in FIG. 11(b), the indication information indicates that DMRSs corresponding to two repeatedly transmitted PUCCHs 1 and a DMRS corresponding to a PUSCH 1 satisfy a QCL relationship.

Figure 11C:
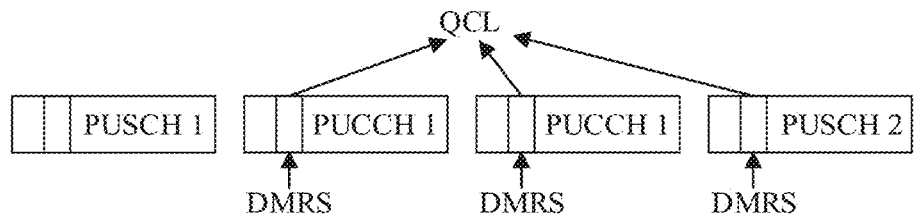

As shown in FIG. 11(c), the indication information indicates that DMRSs corresponding to two repeatedly transmitted PUCCHs 1 and a DMRS corresponding to a PUSCH 2 satisfy a QCL relationship.

Figure 11D:
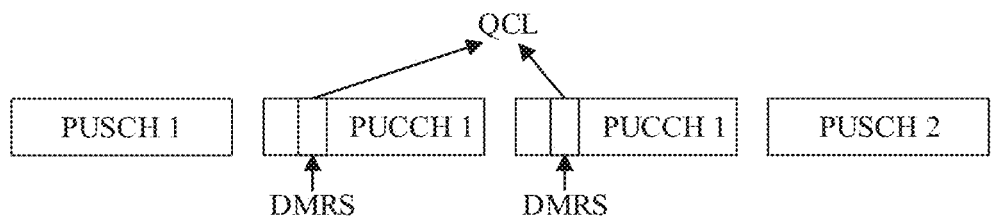

As shown in FIG. 11(d), the indication information indicates that DMRSs corresponding to two repeatedly transmitted PUCCHs 1 satisfy a QCL relationship.

In any one of the examples shown in FIG. 11(a) to FIG. 11(d), the two PUSCHs 1 are uplink physical channels of a same type, and the PUSCH 1 and the PUSCH 2 are uplink physical channels of a same type. The DMRS in any one of the examples shown in FIG. 11(a) to FIG. 11(d) not only represents a DINARS on an OFDM symbol, but also can represent all DMRSs on a PUSCH. One PUSCH may include a plurality of DMRS. In addition, by using same transmit power, the terminal device may perform transmissions on OFDM symbols on which DMRS resources are located.

In an example, the transmit power of the terminal device on the OFDM symbols on which the DMRS resources are located may be a maximum value, a minimum value, or an average value of initial power on the DMRS resources indicated by the indication information.

In an example, the transmit power of the terminal device on the OFDM symbols on which the DMRS resources are located may be inconsistent with transmit power of the PUSCH and/or the PUCCH.

In yet another embodiment, a network device may send indication information to a terminal device, where the indication information indicates that one SRS and DMRS's corresponding to different PUSCHs and PUCCHs satisfy a QCL relationship. The terminal device performs uplink transmissions of the SRS, PUSCHs, and PUCCHs based on the indication information.

The indication information may include the following cases.

Figure 12A:
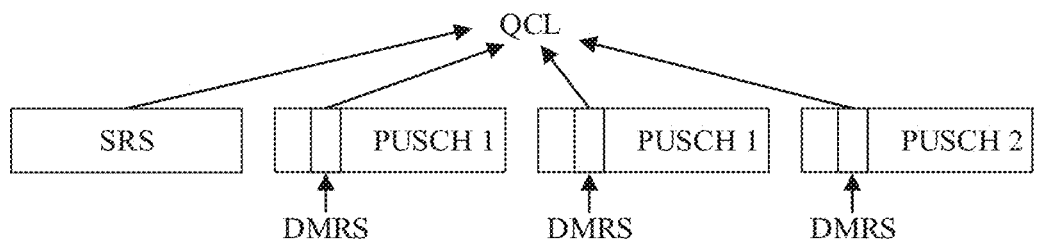
FIG. 12(a) to FIG. 12(d) are schematic diagrams of yet another embodiment in which a plurality of uplink transmissions satisfy a quasi co-location relationship according to this disclosure.

As shown in FIG. 12(a), the indication information indicates that one SRS, DMRSs corresponding to two repeatedly transmitted PUSCHs 1, and a DMRS corresponding to one PUSCH 2 satisfy a QCL relationship. The PUSCH 1 and the PUSCH 2 transmit different content. The PUSCH 1 and the PUSCH 2 are uplink physical channels of a same type.

Figure 12B:
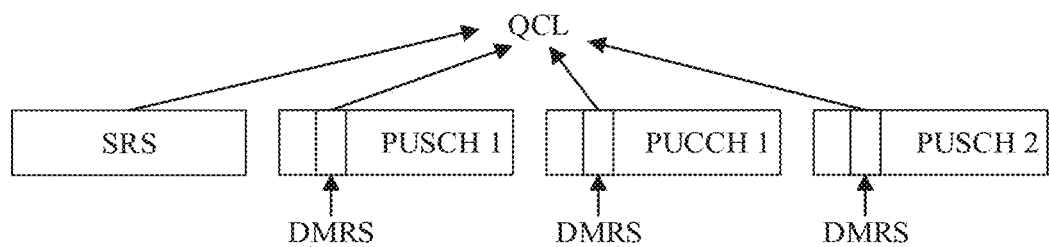

As shown in FIG. 12(b), the indication information indicates that one SRS, a DMRS corresponding to one PUCCH 1, a DMRS corresponding to one PUSCH 1, and a DMRS corresponding to one PUSCH 2 satisfy a QCL relationship. The PUSCH 1 and the PUSCH 2 transmit different content.

Figure 12C:
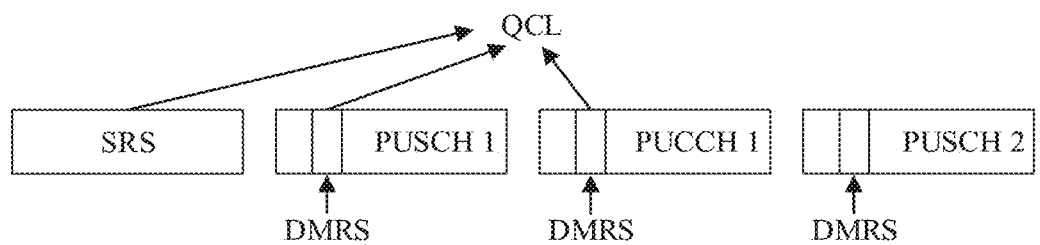

As shown in FIG. 12(c), the indication information indicates that one SRS, a DMRS corresponding to one PUCCH 1, and a DMRS corresponding to one PUTSCH 1 satisfy a QCL relationship.

Figure 12D:
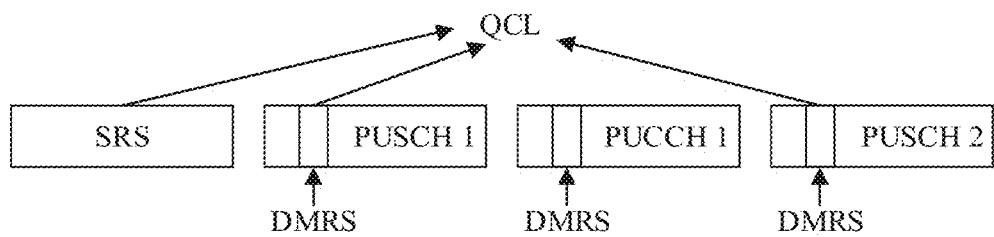

As shown in FIG. 12(d), the indication information indicates that one SRS, a DMRS corresponding to one PUSCH 1, and a DMRS corresponding to one PUSCH 2 satisfy a QCL relationship. The PUSCH 1 and the PUSCH 2 transmit different content.

In any one of the examples shown in FIG. 12(b) to FIG. 12(d), the PUSCH 1 and the PUSCH 2 are uplink physical channels of a same type, and the PUSCH 1 and the PUCCH 1 are uplink physical channels of different types.

The DMRS in any one of the examples shown in FIG. 12(a) to FIG. 12(d) not only represents a DMRS on an OFDM symbol, but also can represent all DMRSs on a PUSCH. One PUSCH may include a plurality of DMRSs. In addition, by using same transmit power, the terminal device may perform transmissions on OFDM symbols on which DMRS resources are located.

In an example, the transmit power of the terminal device on the OFDM symbols on Which the DMRS resources are located may be a maximum value, a minimum value, or an average value of initial power on the DMRS resources indicated by the indication information.

In an example, the transmit power of the terminal device on the OFDM symbols on which the DMRS resources are located may be inconsistent with transmit power of the PUSCH and/or the PUCCH.

The DMRS in any one of the foregoing examples not only refers to a LAIRS on an OFDM symbol, but also refers to several DMRSs in an uplink transmission. For example, in a PUSCH transmission, a DMRS or DMRSs may exist on a total of one, two, three, or four OFDM symbols. Specific positions of the DMRSs and a quantity thereof depend on a DMRS-related parameter configuration.

Initial power in any one of the foregoing examples is transmit power, and the initial power may be transmit power obtained through calculation by using a power control formula.

Figure 13:
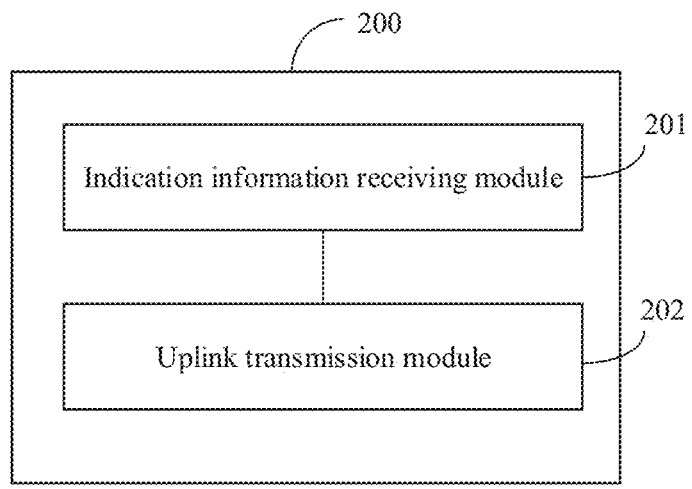
FIG. 13 is a schematic structural diagram of an embodiment of an uplink transmission apparatus according to this disclosure.

FIG. 13 is a schematic structural diagram of an embodiment of an uplink transmission apparatus according to a third aspect of this disclosure. The uplink transmission apparatus is applied to a terminal device. As shown in FIG. 13, the uplink transmission apparatus 200 includes:

an indication information receiving module 201, configured to receive indication information sent by a network device, where the indication information is used to indicate that a plurality of first uplink transmissions satisfy a quasi co-location relationship; and an uplink transmission module 202, configured to perform the plurality of first uplink transmissions based on the indication information.

In this embodiment of this disclosure, the network device indicates, to the terminal device, that the plurality of first uplink transmissions satisfy the quasi co-location relationship. The terminal device performs the uplink transmissions based on the indication of the network device. Therefore, the uplink transmissions of the terminal device satisfy power consistency and/or phase continuity, so that the network device can perform joint channel estimation. In this case, reliability and flexibility of uplink transmission channel estimation can be improved. Therefore, reception performance of the network device is improved.

In one or more embodiments of this disclosure, the quasi co-location relationship may include at least one of the following: an average gain, a delay spread, an average delay, power consistency, and phase continuity.

In one or more embodiments of this disclosure, the indication information may be carried by higher layer signaling and/or downlink control information DCI.

In one or more embodiments of this disclosure, an uplink transmission in the plurality of first uplink transmissions may include an uplink physical channel 213 and/or an uplink physical signal;

the uplink physical channel may include at least one of the following: a physical uplink shared channel PUSCH, a physical uplink control channel PUCCH, and a physical random access channel PRACH; and the uplink physical signal may include at least one of the following: a sounding reference signal SRS, a PUSCH demodulation reference signal DINARS, a PUCCH DMRS, and a PUSCH phase tracking reference signal PTRS.

In one or more embodiments of this disclosure, the plurality of first uplink transmissions may include at least one of the following:

a plurality of uplink physical channels of a same type;
a plurality of uplink physical channels of different types;
a plurality of uplink physical signals of a same type; and
a plurality of uplink physical signals of different types.

in one or more embodiments of this disclosure, the plurality of first uplink transmissions may include at least one of the following:

a plurality of uplink physical channels of a same type, where the plurality of uplink physical channels transmit different content;

a plurality of uplink physical channels of a same type, where the plurality of uplink physical channels transmit repeated content;

a plurality of uplink physical channels of different types;

a plurality of uplink physical signals of a same type, where the plurality of uplink physical signals transmit different content;

a plurality of uplink physical signals of a same type, where the plurality of uplink physical signals transmit repeated content;

a plurality of uplink physical signals of different types;

a plurality of uplink physical channels of different types and a plurality of uplink physical signals of different types, where the plurality of uplink physical channels transmit different content, and the plurality of uplink physical signals transmit different content; and a plurality of uplink physical channels of different types and a plurality of uplink physical signals of different types, where the plurality of uplink physical channels transmit repeated content, and the plurality of uplink physical signals transmit repeated content.

In one or more embodiments of this disclosure, the indication information may be further used to indicate that a plurality of second uplink transmissions satisfy a quasi co-location relationship; and the uplink transmission module 202 may be specifically configured to:

perform the plurality of first uplink transmissions and the plurality of second uplink transmissions based on the indication information.

In one or more embodiments of this disclosure, the plurality of second uplink transmissions and the plurality of first uplink transmissions may satisfy a quasi co-location relationship.

In one or more embodiments of this disclosure, the uplink transmission module 202 may include:

a first uplink transmission module, configured to perform a plurality of parts of uplink transmissions based on the indication information and based on a quasi co-location relationship satisfied by each of the plurality of parts, where the plurality of parts are a plurality of parts formed by the plurality of first uplink transmissions, and each part includes at least one first uplink transmission.

In one or more embodiments of this disclosure, the first uplink transmission module may be configured to:

perform the plurality of parts of uplink transmissions based on the indication information and based on the quasi co-location relationship satisfied by each part and a quasi co-location relationship between the plurality of parts.

In one or more embodiments of this disclosure, the uplink transmission module 202 may include:

a second uplink transmission module, configured to perform the plurality of first uplink transmissions on a first serving cell based on the indication information, and skip performing an uplink transmission on a second serving cell other than the first serving cell.

In one or more embodiments of this disclosure, the first serving cell may be a primary serving cell or a primary secondary cell.

In one or more embodiments of this disclosure, the second uplink transmission module may be configured to:

skip performing, on the second serving cell, an uplink transmission configured by radio resource control RRC signaling;

and/or skip performing, on the second serving cell, an uplink transmission indicated by DCI.

In one or more embodiments of this disclosure, the uplink transmission module 202 may include:

a third uplink transmission module, configured to perform, on every orthogonal frequency division multiplexing OFDM symbol for the plurality of first uplink transmissions, the plurality of first uplink transmissions by using first power.

In one or more embodiments of this disclosure, the first power is maximum transmit power, minimum transmit power, or average transmit power in the plurality of first uplink transmissions.

In this embodiment of this disclosure, the network device indicates, to the terminal device, that the plurality of first uplink transmissions satisfy the quasi co-location relationship. The terminal device performs the uplink transmissions based on the indication of the network device. Therefore, the uplink transmissions of the terminal device satisfy power consistency and/or phase continuity, so that the network device can perform joint channel estimation. In this case, reliability and flexibility of uplink transmission channel estimation can be improved. Therefore, reception performance of the network device is improved.

Figure 14:
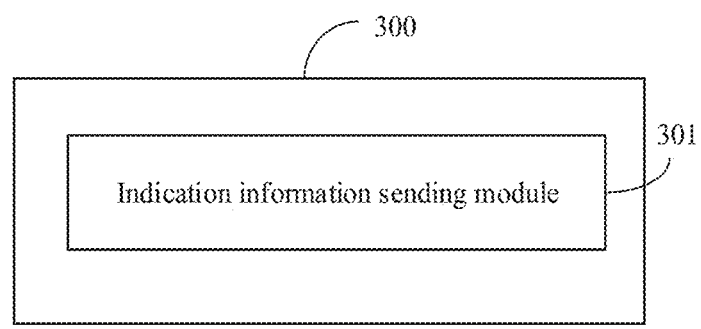
FIG. 14 is a schematic structural diagram of an embodiment of an uplink transmission apparatus according to this disclosure.

FIG. 14 is a schematic structural diagram of an embodiment of an uplink transmission apparatus according to a fourth aspect of this disclosure. The uplink transmission apparatus is applied to a network device. As shown in FIG. 14, the uplink transmission apparatus 300 includes:

an indication information sending module 301, configured to send indication information to a terminal device, where the indication information is used to indicate that a plurality of first uplink transmissions satisfy a quasi co-location relationship, so that the terminal device performs the plurality of first uplink transmissions based on the indication information.

In this embodiment of this disclosure, the network device indicates, to the terminal device, that the plurality of first uplink transmissions satisfy the quasi co-location relationship. The terminal device performs the uplink transmissions based on the indication of the network device. Therefore, the uplink transmissions of the terminal device satisfy power consistency and/or phase continuity, so that the network device can perform joint channel estimation. In this case, reliability and flexibility of uplink transmission channel estimation can be improved. Therefore, reception performance of the network device is improved.

In an embodiment of this disclosure, the quasi co-location relationship may include at least one of the following: an average gain, a delay spread, an average delay, power consistency, and phase continuity.

In an embodiment of this disclosure, the indication information may be carried by higher layer signaling and/or downlink control information DCI.

In an embodiment of this disclosure, an uplink transmission in the plurality of first uplink transmissions may include an uplink physical channel and/or an uplink physical signal;
the uplink physical channel may include at least one of the following: a physical uplink shared channel PUSCH, a physical uplink control channel PUCCH, and a physical random access channel PRACH; and
the uplink physical signal may include at least one of the following: a sounding reference signal SRS, a PUSCH demodulation reference signal DMRS, a PUCCH DMRS, and a PUSCH phase tracking reference signal PTRS.

In an embodiment of this disclosure, the plurality of first uplink transmissions may include at least one of the following:
a plurality of uplink physical channels of a same type;
a plurality of uplink physical channels of different types;
a plurality of uplink physical signals of a same type; and
a plurality of uplink physical signals of different types.

In an embodiment of this disclosure, the plurality of first uplink transmissions may include at least one of the following:
a plurality of uplink physical channels of a same type, where the plurality of uplink physical channels transmit different content;
a plurality of uplink physical channels of a same type, where the plurality of uplink physical channels transmit repeated content;
a plurality of uplink physical channels of different types;
a plurality of uplink physical signals of a same type, where the plurality of uplink physical signals transmit different content;
a plurality of uplink physical signals of a same type, where the plurality of uplink physical signals transmit repeated content;
a plurality of uplink physical signals of different types;
a plurality of uplink physical channels of different types and a plurality of uplink physical signals of different types, where the plurality of uplink physical channels transmit different content, and the plurality of uplink physical signals transmit different content; and
a plurality of uplink physical channels of different types and a plurality of uplink physical signals of different types, where the plurality of uplink physical channels transmit repeated content, and the plurality of uplink physical signals transmit repeated content.

In an embodiment of this disclosure, the indication information may be further used to indicate that a plurality of second uplink transmissions satisfy a quasi co-location relationship, so that the terminal device performs the plurality of first uplink transmissions and the plurality of second uplink transmissions based on the indication information.

In an embodiment of this disclosure, the plurality of second uplink transmissions and the plurality of first uplink transmissions may satisfy a quasi co-location relationship.

An embodiment of this disclosure further provides a terminal device, including a processor, a memory, and a computer program stored in the memory and capable of running on the processor. When the computer program is executed by the processor, each process of the foregoing uplink transmission method embodiment applied to the terminal device is implemented, with the same technical effect achieved. To avoid repetition, details are not described herein again.

Figure 15:
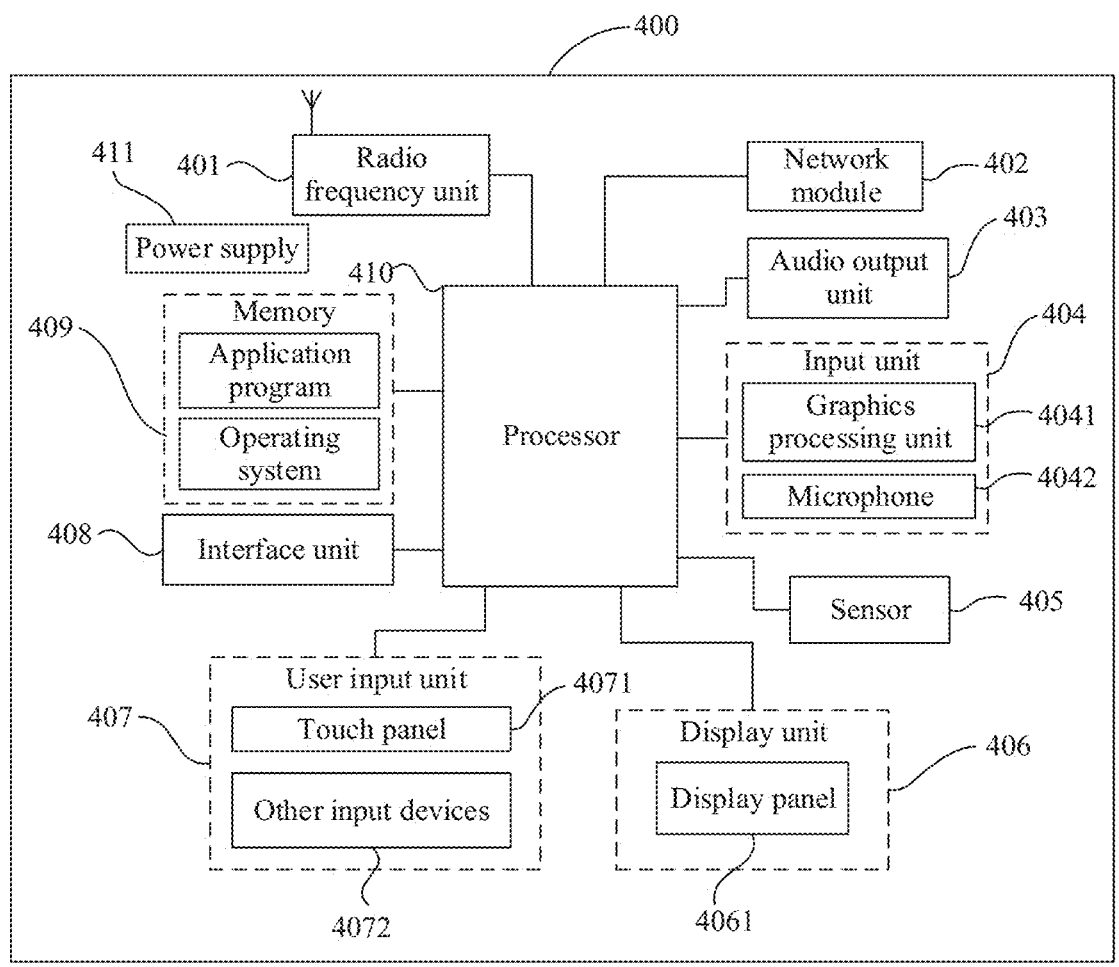
FIG. 15 is a schematic diagram of a hardware structure of an embodiment of a terminal device according to this disclosure.

FIG. 15 is a schematic diagram of a hardware structure of an embodiment of a terminal device according to this disclosure. The terminal device 400 includes but is not limited to components such as a radio frequency unit 401, a network module 402, an audio output unit 403, an input unit 404, a sensor 405, a display unit 406, a user input unit 407, an interface unit 408, a memory 409, a processor 410, and a power supply 411. A person skilled in the art may understand that the structure of the terminal device shown in FIG. 15 does not constitute any limitation on the terminal device. The terminal device may include more or fewer components than those shown in the figure, or a combination of some components, or the components disposed differently. In this embodiment of this disclosure, the terminal device includes but is not limited to a mobile phone, a tablet computer, a notebook computer, a palmtop computer, a vehicle-mounted terminal, a wearable device, a pedometer, or the like.

The radio frequency unit 401 is configured to receive indication information sent by a network device, where the indication information is used to indicate that a plurality of first uplink transmissions satisfy a quasi co-location relationship.

The processor 410 is configured to perform the plurality of first uplink transmissions based on the indication information.

In this embodiment of this disclosure, the network device indicates, to the terminal device, that the plurality of first uplink transmissions satisfy the quasi co-location relationship. The terminal device performs the uplink transmissions based on the indication of the network device. Therefore, the uplink transmissions of the terminal device satisfy power consistency and/or phase continuity, so that the network device can perform joint channel estimation. In this case, reliability and flexibility of uplink transmission channel estimation can be improved. Therefore, reception performance of the network device is improved.

It should be understood that in this embodiment of this disclosure, the radio frequency unit 401 may be configured to receive and send signals in an information reception or transmission or call process. Specifically, after receiving downlink data from a base station, the radio frequency unit 401 sends the downlink data to the processor 410 for processing, and in addition, sends uplink data to the base station. Generally, the radio frequency unit 401 includes but is not limited to an antenna, at least one amplifier, a transceiver, a coupler, a low noise amplifier, duplexer, and the like. In addition, the radio frequency unit 401 may also communicate with a network and other devices via a wireless communications system.

The terminal device provides a user with wireless broadband internee access through the network module 402, for example, helping the user transmit and receive e-mails, browse web pages, and access streaming media.

The audio output unit 403 may convert audio data received by the radio frequency unit 401 or the network module 402 or stored in the memory 409 into an audio signal and output the audio signal as a sound. Furthermore, the audio output unit 403 may also provide an audio output (for example, a call signal received sound or a message received sound) related to a specific function performed by the terminal device 400. The audio output unit 403 includes a speaker, a buzzer, a receiver, and the like.

The input unit 404 is configured to receive an audio or video signal. The input unit 404 may include a graphics processing unit (GPU) 4041 and a microphone 4042. The graphics processing unit 4041 processes image data of a still picture or video obtained by an image capture apparatus (such as a camera) in a video capture mode or an image capture mode. A processed image frame may be displayed on the display unit 406. The image frame processed by the graphics processing unit 4041 may be stored in the memory 409 (or another storage medium) or be sent by the radio frequency unit 401 or the network module 402. The microphone 4042 is capable of receiving sounds and processing such sounds into audio data. The processed audio data can be converted into a format that can be sent to a mobile communication base station through the radio frequency unit 401 in a telephone call mode, for outputting.

The terminal device 400 further includes at least one sensor 405, for example, an optical sensor, a motion sensor, and other sensors. Specifically, the optical sensor includes an ambient light sensor and a proximity sensor. The ambient light sensor may adjust luminance of the display panel 4061 based on brightness of ambient light, and the proximity sensor may turn off the display panel 4061 and/or backlight when the terminal device 400 moves close to an ear. As a type of motion sensor, an accelerometer sensor can detect magnitudes of accelerations in all directions (usually three axes), can detect a magnitude and a direction of gravity when the terminal device is in a static state, and can be applied to posture recognition (such as screen switching between portrait and landscape, related games, and magnetometer posture calibration) of the terminal device, functions related to vibration recognition (such as pedometer and tapping), and the like. The sensor 405 may also include a fingerprint sensor, a pressure sensor, an iris sensor, a molecular sensor, a gyroscope, a barometer, a hygrometer, a thermometer, an infrared sensor, and the like. Details are not described herein.

The display unit 406 is configured to display information input by the user or information provided to the user. The display unit 406 may include a display panel 4061, and the display panel 4061 may be configured in a form of a liquid crystal display (LCD), an organic light-emitting diode (OLED), or the like.

The user input unit 407 may be configured to receive input digit or character information and generate key signal input related to user setting and function control of the terminal device Specifically, the user input unit 407 includes a touch panel 4071 and other input devices 4072. The touch panel 4071 is also referred to as a touchscreen and can collect a touch operation (such as an operation performed by the user on the touch panel 4071 or near the touch panel 4071 with a finger or by using any proper object or accessory such as a stylus) of the user on or near the touch panel 4071. The touch panel 4071 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, and sends the touchpoint coordinates to the processor 410, and receives a command sent by the processor 410 and executes the command. In addition, the touch panel 4071 may be implemented in a plurality of forms, for example, as a resistive, capacitive, infrared, or surface acoustic wave touch panel. The user input unit 407 may further include the other input devices 4072 in addition to the touch panel 4071. Specifically, the other input devices 4072 may include but are not limited to a physical keyboard, a function key (such as a volume control key or a switch key), a trackball, a mouse, and a joystick. Details are not described herein.

Further, the touch panel 4071 may cover the display panel 4061. When detecting a touch operation on or near the touch panel 4071, the touch panel 4071 transmits the touch operation to the processor 410 to determine a type of a touch event. Then, the processor 410 provides a corresponding visual output on the display panel 4061 based on the type of the touch event. Although in FIG. 15, the touch panel 4071 and the display panel 4061 act as two independent parts to implement input and output functions of the terminal device, in some embodiments, the touch panel 4071 and the display panel 4061 may be integrated to implement the input and output functions of the terminal device. This is not specifically limited herein.

The interface unit 408 is an interface between an external apparatus and the terminal device 400. For example, an external apparatus may include a wired or wireless headset port, an external power supply (or a battery charger) port, a wired or wireless data port, a memory port, a port for connecting an apparatus with an identification module, an audio input/output (I/O) port, a video I/O port, an earphone port, and the like. The interface unit 408 may be configured to: receive an input (for example, data information and power) from the external apparatus, and transmit the received input to one or more elements in the terminal device 400, or may be configured to transmit data between the terminal device 400 and the external apparatus.

The memory 409 may be configured to store software programs and various data. The memory 409 may primarily include a program storage area and a data storage area. The program storage area may store an operating system, an application (such as an audio play function and an image play function) required by at least one function, and the like. The data storage area may store data (such as audio data and a phone book) created based on use of the mobile phone, in addition, the memory 409 may include a high-speed random access memory, and may further include a non-volatile memory such as a disk storage device, a flash memory device, or another volatile solid-state storage device.

The processor 410 is a control center of the terminal device, uses various interfaces and lines to connect parts of the entire terminal device, and executes various functions and processing data of the terminal device by running or executing software programs and/or modules stored in the memory 409 and invoking data stored in the memory 409, so as to perform overall monitoring on the terminal device. The processor 410 may include one or more processing units. In an example, an application processor and a modem processor may be integrated in the processor 410. This disclosure processor primarily processes an operating system, user interfaces, application programs, and the like. The modem processor primarily processes radio communication. It can be understood that the modem processor may alternatively be not integrated in the processor 410.

The terminal device 400 may further include the power supply 411 (such as a battery) for supplying power to the components. Optionally, the power supply 411 may be logically connected to the processor 410 through a power management system. In this way, functions such as charge management, discharge management, and power consumption management are implemented by using the power management system.

In addition, the terminal device 400 includes some functional modules that are not shown. Details are not described herein.

An embodiment of this disclosure further provides a network device, including a processor, a memory, and a computer program stored in the memory and capable of running on the processor. When the computer program is executed by the processor, each process of the foregoing uplink transmission method embodiment applied to the network device is implemented, with the same technical effect achieved. To avoid repetition, details are not described herein again.

An embodiment of this disclosure further provides a computer readable storage medium, where a computer program is stored in the computer readable storage medium. When the computer program is executed by a processor, each process of the foregoing uplink transmission method embodiment is implemented, with the same technical effect achieved. To avoid repetition, details are not described herein again. The computer-readable storage medium includes, for example, a non-transitory computer-readable storage medium, such as a read-only memory (ROM), a random access memory (RAM), a magnetic disk, or an optical disc.

An embodiment of this disclosure further provides a computer program product. When the computer program product is executed by at least one processor, each process of the uplink transmission method embodiment according to the first aspect or each process of the uplink transmission method embodiment according to the second aspect is implemented.

An embodiment of this disclosure further provides a communications device. The communications device is configured to perform each process of the uplink transmission method embodiment according to the first aspect or each process of the uplink transmission method embodiment according to the second aspect.

In an example, the communications device may be a terminal device or a network device. When the communications device is a terminal device, the terminal device may be configured to perform each process of the uplink transmission method embodiment according to the first aspect. When the communications device is a network device, the network device may be configured to perform each process of the uplink transmission method embodiment according to the second aspect.

It should be noted that in this specification, the term "comprise", "include", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

It should also be noted that flowcharts and block diagrams in the accompanying drawings illustrate the architecture, functionality, and operation of possible implementations of systems, methods, and computer program products according to various embodiments of this disclosure. In this aspect, each block in the flowcharts or the block diagrams may represent a module, a segment, or part of code, and the module, the segment, or the part of code includes one or more executable instructions used to realize (one or more) specified logical functions. It should also be noted that in some alternative implementations, the functions indicated in the blocks may alternatively occur in a different order than indicated in the drawings. For example, depending on the functions involved, two blocks shown in succession may actually be executed at substantially the same time, or the blocks may sometimes be executed in a reverse order. It should also be noted that each block in the block diagrams and/or the flowcharts and a combination of the blocks in the block diagrams and/or the flowcharts may be implemented by a dedicated hardware-based system for executing a specified function or operation or may be implemented by a combination of dedicated hardware and computer instructions.

According to the foregoing description of the implementations, a person skilled in the art may clearly understand that the methods in the foregoing embodiments may be implemented by using software in combination with a necessary common hardware platform, and certainly may alternatively be implemented by using hardware or software. However, in most cases, the former is a preferred implementation. Based on such an understanding, the technical solutions of this disclosure essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this disclosure.

The embodiments of this disclosure are described above with reference to the accompanying drawings, but this disclosure is not limited to the embodiments. The embodiments are only illustrative rather than restrictive. Inspired by this disclosure, a person of ordinary skill in the art can still derive a plurality of variations without departing from the essence of this disclosure and the protection scope of the claims. All these variations shall fall within the protection of this disclosure.

What is claimed is:

1. An uplink transmission method, applied to a terminal device, wherein the method comprises:
   receiving indication information sent by a network device, wherein the indication information is used to indicate that a plurality of first uplink transmissions satisfy a quasi co-location relationship; and
   performing the plurality of first uplink transmissions based on the indication information;
   wherein the quasi co-location relationship comprises at least one of the following: power consistency, and phase continuity;
   wherein the plurality of first uplink transmissions comprise at least one of the following:
   a plurality of uplink physical channels of a same type; and
   a plurality of uplink physical signals of a same type.

2. The method according to claim 1, wherein the quasi co-location relationship further comprises at least one of the following: an average gain, a delay spread, and an average delay.

3. The method according to claim 1, wherein the indication information is carried by higher layer signaling and/or downlink control information (DCI).

4. The method according to claim 1, wherein an uplink transmission in the plurality of first uplink transmissions comprises an uplink physical channel and/or an uplink physical signal;
   the uplink physical channel comprises at least one of the following: a physical uplink shared channel (PUSCH), a physical uplink control channel (PUCCH), and a physical random access channel (PRACH); and
   the uplink physical signal comprises at least one of the following: a sounding reference signal (SRS), a PUSCH demodulation reference signal (DMRS), a PUCCH DMRS, and a PUSCH phase tracking reference signal (PTRS).

5. The method according to claim 1, wherein the indication information is further used to indicate that a plurality of second uplink transmissions satisfy a quasi co-location relationship; and
   the performing the plurality of first uplink transmissions based on the indication information comprises:
   performing the plurality of first uplink transmissions and the plurality of second uplink transmissions based on the indication information.

6. The method according to claim 1, wherein the performing the plurality of first uplink transmissions based on the indication information comprises:
   performing a plurality of parts of uplink transmissions based on the indication information and based on a quasi co-location relationship satisfied by each of the plurality of parts, wherein the plurality of parts are a plurality of parts formed by the plurality of first uplink transmissions, and each part comprises at least one first uplink transmission; or,
   performing the plurality of first uplink transmissions on a first serving cell based on the indication information, and skipping performing an uplink transmission on a second serving cell other than the first serving cell; or,
   performing, on every orthogonal frequency division multiplexing (OFDM) symbol for the plurality of first uplink transmissions, the plurality of first uplink transmissions by using first power.

7. The method according to claim 6, wherein the first serving cell is a primary serving cell or a primary secondary cell.

8. The method according to claim 6, wherein the skipping performing an uplink transmission on a second serving cell other than the first serving cell comprises:
   skipping performing, on the second serving cell, an uplink transmission configured by radio resource control RRC signaling;
   and/or
   skipping performing, on the second serving cell, an uplink transmission indicated by DCI.

9. The method according to claim 1, wherein the performing the plurality of first uplink transmissions based on the indication information comprises:
   performing, on every orthogonal frequency division multiplexing OFDM symbol for the plurality of first uplink transmissions, the plurality of first uplink transmissions by using first power.

10. The method according to claim 9, wherein the first power is maximum transmit power, minimum transmit power, or average transmit power in the plurality of first uplink transmissions.

11. A terminal device, comprising a processor, a memory, and a computer program stored in the memory and capable of running on the processor, wherein when the computer program is executed by the processor, the steps of an uplink transmission method are implemented, wherein the method comprises:
    receiving indication information sent by a network device, wherein the indication information is used to indicate that a plurality of first uplink transmissions satisfy a quasi co-location relationship; and
    performing the plurality of first uplink transmissions based on the indication information;
    wherein the quasi co-location relationship comprises at least one of the following: power consistency, and phase continuity;
    wherein the plurality of first uplink transmissions comprise at least one of the following:
    a plurality of uplink physical channels of a same type; and
    a plurality of uplink physical signals of a same type.

12. The terminal device according to claim 11, wherein the quasi co-location relationship further comprises at least one of the following: an average gain, a delay spread, and an average delay.

13. The terminal device according to claim 11, wherein the indication information is carried by higher layer signaling and/or downlink control information (DCI).

14. The terminal device according to claim 11, wherein an uplink transmission in the plurality of first uplink transmissions comprises an uplink physical channel and/or an uplink physical signal;
    the uplink physical channel comprises at least one of the following: a physical uplink shared channel (PUSCH), a physical uplink control channel (PUCCH), and a physical random access channel (PRACH); and the uplink physical signal comprises at least one of the following: a sounding reference signal (SRS), a PUSCH demodulation reference signal (DMRS), a PUCCH DMRS, and a PUSCH phase tracking reference signal (PTRS).

15. The terminal device according to claim 11, wherein the indication information is further used to indicate that a plurality of second uplink transmissions satisfy a quasi co-location relationship; and the performing the plurality of first uplink transmissions based on the indication information comprises:

performing the plurality of first uplink transmissions and the plurality of second uplink transmissions based on the indication information.

16. A network device, comprising a processor, a memory, and a computer program stored in the memory and capable of running on the processor, wherein when the computer program is executed by the processor, the steps of an uplink transmission method are implemented, wherein the method comprises:

sending indication information to a terminal device, wherein the indication information is used to indicate that a plurality of first uplink transmissions satisfy a quasi co-location relationship, so that the terminal device performs the plurality of first uplink transmissions based on the indication information;

wherein the quasi co-location relationship comprises at least one of the following: power consistency, and phase continuity;

wherein the plurality of first uplink transmissions comprise at least one of the following:

a plurality of uplink physical channels of a same type; and a plurality of uplink physical signals of a same type.

17. The network device according to claim 16, wherein the quasi co-location relationship further comprises at least one of the following: an average gain, a delay spread, an average delay.

18. The network device according to claim 16, wherein the indication information is carried by higher layer signaling and/or downlink control information (DCI).

19. The network device according to claim 16, wherein an uplink transmission in the plurality of first uplink transmissions comprises an uplink physical channel and/or an uplink physical signal;

the uplink physical channel comprises at least one of the following: a physical uplink shared channel (PUSCH), a physical uplink control channel (PUCCH), and a physical random access channel (PRACH); and the uplink physical signal comprises at least one of the following: a sounding reference signal (SRS), a PUSCH demodulation reference signal (DMRS), a PUCCH DMRS, and a PUSCH phase tracking reference signal (PTRS).

* * * * *